United States Patent
Kitchener

[11] Patent Number: 5,803,715
[45] Date of Patent: Sep. 8, 1998

[54] INLET CONTROL COMBINATION FOR A COMPRESSOR SYSTEM

[75] Inventor: Anthony John Kitchener, East St. Kilda, Australia

[73] Assignee: Cash Engineering Research Pty. Ltd., Richmond, Australia

[21] Appl. No.: 745,315

[22] Filed: Nov. 12, 1996

Related U.S. Application Data

[63] Continuation of Ser. No. 204,424, filed as PCT/AU92/00547, Oct. 14, 1992 published as WO93/08404, Apr. 29, 1993, abandoned.

[30] Foreign Application Priority Data

Oct. 14, 1996 [AU] Australia ............................. PK 8876

[51] Int. Cl.[6] ............................................. F04B 49/00
[52] U.S. Cl. ........................................ 417/295; 417/313
[58] Field of Search ............................... 417/313, 295, 417/307, 309

[56] References Cited

U.S. PATENT DOCUMENTS

| | | | |
|---|---|---|---|
| 3,349,994 | 10/1967 | Bloom | 417/295 |
| 3,482,768 | 12/1969 | Cirrincione et al. | 417/295 |
| 3,825,372 | 7/1974 | Lundberg et al. | |
| 4,361,417 | 11/1982 | Suzuki | 417/295 |
| 4,406,589 | 9/1983 | Tsuchida et al. | 417/295 |
| 4,515,515 | 5/1985 | Segonne | 417/295 |
| 4,553,906 | 11/1985 | Boller et al. | 417/295 |

FOREIGN PATENT DOCUMENTS

| | | |
|---|---|---|
| 118772 | 8/1944 | Australia . |
| 284787 | 5/1964 | Australia . |
| 90826/82 | 6/1983 | Australia . |
| 91417/82 | 6/1983 | Australia . |
| 25298/84 | 7/1987 | Australia . |
| 3445400 | 6/1986 | Germany . |
| 1134224 | 11/1968 | United Kingdom . |
| 2020748 | 11/1979 | United Kingdom . |

*Primary Examiner*—Charles G. Freay
*Attorney, Agent, or Firm*—Bell Seltzer Intellectual Property Law Group of Alston & Bird LLP

[57] ABSTRACT

A flooded compressor control system that comprises a flooded compressor (11), an inlet throttle valve (14) and a final filter (25) mounted separately from a separator vessel (23) wherein the inlet throttle valve (14) and the final filter (25) form a combined assembly, the final filter (25) further incorporates a minimum pressure valve (28) that controls the discharge of clean compressed gas from the final filter (25) resulting in a reduction in the number of pipe joints in the system.

13 Claims, 21 Drawing Sheets

(SECTION III-III)

SECTION V-V (SECTION VI-VI)

UNLOADED

LOADED

INLET CONTROL COMBINATION FOR A COMPRESSOR SYSTEM

This application is a continuation of application Ser. No. 08/204,424, filed as PCT/AU92/00547, Oct. 14, 1992 published as WO93/08404, Apr. 29, 1993, now abandoned.

The present invention relates to improvements in compressor systems or their component parts and particularly to flooded compressor systems employing screw or similar rotating means to effect compression of the gas.

Systems of the aforementioned kind conventionally comprise a number of major component parts including a screw compressor unit adapted to receive air to be compressed through an Inlet filter and a main throttle valve. Lubricating oil is also introduced into the screw compressor unit adjacent its inlet zone and a mixture of compressed gas and oil is discharged from this unit to be separated in a separator vessel. Oil collected in the separator vessel is returned via a filter and an oil cooler to the screw compressor unit and dean compressed air is discharged from the separator vessel. The discharged compressed air normally passes through a coalescent type final filter to remove any remaining oil droplets which is commonly housed within or in communication with the main separator vessel with the attendant problems as discussed in UK Patent No. 0,121,999. Moreover, a minimum pressure valve is supplied in the clean compressed air discharge line from the separator vessel so that the valve remains closed until such time as gas pressure in the separator vessel exceeds a predetermined minimum level. Commonly the compressed gas is discharged Into a storage vessel from which it is withdrawn for the desired end use. Pressure within the storage vessel is used to control operation of the compressor unit. A typical arrangement of this kind is disclosed in UK Patent No. 0,130,662. One difficulty with such systems involves the physical size of the complete package which also has an adverse effect on the expense of production. Moreover, the number of interconnecting pipes and corresponding joints, which may cause possible leakage problems, also has an adverse effect on fabrication costs. Further the incorporation of the final filter element within the separator vessel also involves significant fabrication processes which also has an adverse effect on production costs for the system.

In a first preferred aspect of the present invention, it is desired to provide a final filter element configuration for compressor systems of the aforementioned kind which enables the element to be produced as a separate item isolated from the separation vessel. According to preferred aspects, the present invention also aims at providing a single control valve arrangement that will act as a main throttle valve as well as a minimum pressure valve for the separator vessel; a separate final filter configuration in combination with a minimum pressure valve; and configuration including all the aforesaid features.

Accordingly, the present invention provides a final filter configuration adapted for connection to a compressor system of the type including a compressor adapted to discharge a mixture of compressed gas and liquid into a separator vessel, said compressed gas being at least partially separated from said liquid in said separator, said final filter configuration including a support member, an outer wall secured to said support member defining an internal substantially enclosed space, a filter element located within said enclosed space having opposed axial ends and an intervening annular wall of filter material, one of said axial ends being sealingly end or connected with said support member and the other of said axial ends being closed to prevent gas flow therethrough from a first zone outwardly of said filter element to a second zone inwardly of said filter element, first communication means being provided to enable flow to or from said first zone, second communication means enabling flow to or from said second zone, and inlet connection means enabling connection in use of one of said first or second communication means to said separator vessel of the compressor system. Preferably releasable connection means is provided between said outer wall and said support member to enable access to the filter means for servicing as may be required. Conveniently the releasable connection means may comprise a screw or threaded connection. Preferably one of said first or second communication means passes through said support member and forms a discharge passage, a minimum pressure valve being provided in said support member controlling flow through said discharge passage. Conveniently the discharge passage may be arranged leading from said second inner zone but a reverse arrangement is also possible.

According to a further aspect of the present invention there is provided a control valve arrangement for a flooded compressor system, said control valve arrangement comprising a main throttle valve adapted to close or open a main gas inlet to a compressor unit of said compressor system and a filter assembly mounted from said control valve arrangement, said control valve arrangement including inlet means to receive a mixture of compressed gas and oil droplets from a separator means of said compressor system and to direct said mixture into said filter assembly, and discharge means within said valve arrangement to discharge clean compressed gas after passage through a filter element within said filter assembly.

In a still further preferred aspect, the present invention provides a control valve arrangement for a flooded compressor system, said control valve arrangement comprising a main throttle valve adapted to close or open a main gas inlet to a compressor unit of said compressor system, inlet compressed gas flow means to receive compressed gas from a separator of said compressor system, and a minimum pressure valve arranged to receive said compressed gas from said inlet gas flow and to discharge said compressed gas from said control valve arrangement only after a predetermined minimum pressure of said compressed gas is achieved. Conveniently said control valve arrangement also includes a filter assembly as aforesaid and said inlet compressed gas flow means is arranged to receive compressed gas after passing through said filter assembly.

Further preferred objectives are to provide compressor system configurations embodying the foregoing concepts.

Accordingly the present invention provides a compressor system comprising a compressor having an inlet throttle valve with said compressor being adapted to discharge a mixture of compressed gas and liquid Into a separator vessel, a final filter configuration arranged to receive compressed gas with entrained liquid droplets from said separator vessel and to discharge therefrom substantially clean compressed gas, and a liquid return communication means from said separator vessel to an inlet zone of said compressor, said compressor system being characterised in that said final filter configuration and said inlet throttle valve are arranged in a combined assembly. Preferably, pressurised gas from said final filter element is communicated through valve means in said combined assembly to the inlet zone of said compressor. Conveniently a minimum pressure valve is arranged in a compressed gas discharge passage of said combined assembly. It will be recognised by those skilled in the art that the minimum pressure valve might simply comprise a restricted orifice, however, normally a non-return valve would also be required.

According to a still further aspect of the present invention a compressor system is provided comprising a compressor having an Inlet throttle valve with said compressor being adapted to discharge a mixture of compressed gas and liquid Into a separator vessel, a final filter configuration arranged to receive compressed gas with entrained liquid droplets from said separator vessel and to discharge therefrom substantially clean compressed gas, and a liquid return communication means from said separator vessel to an inlet zone of said compressor, said compressor system being characterised in that said final filter configuration is arranged separate from said separator vessel and includes a minimum pressure valve in a clean compressed gas discharge passage in said configuration.

The arrangements thus defined all have the effect of reducing fabrication costs of the compressor system and in particular the number of connecting pipes and pipe end joints that need to be used in the system. The greatest effect is achieved where the filter element, main inlet throttle valve and minimum pressure discharge valve are all combined as a unitary assembly, however, improvements are still achieved relative to conventional systems, with other assembly arrangements as discussed above.

Several preferred embodiments of the present invention will now be described with reference to the accompanying drawings, in which.

Figure 1:
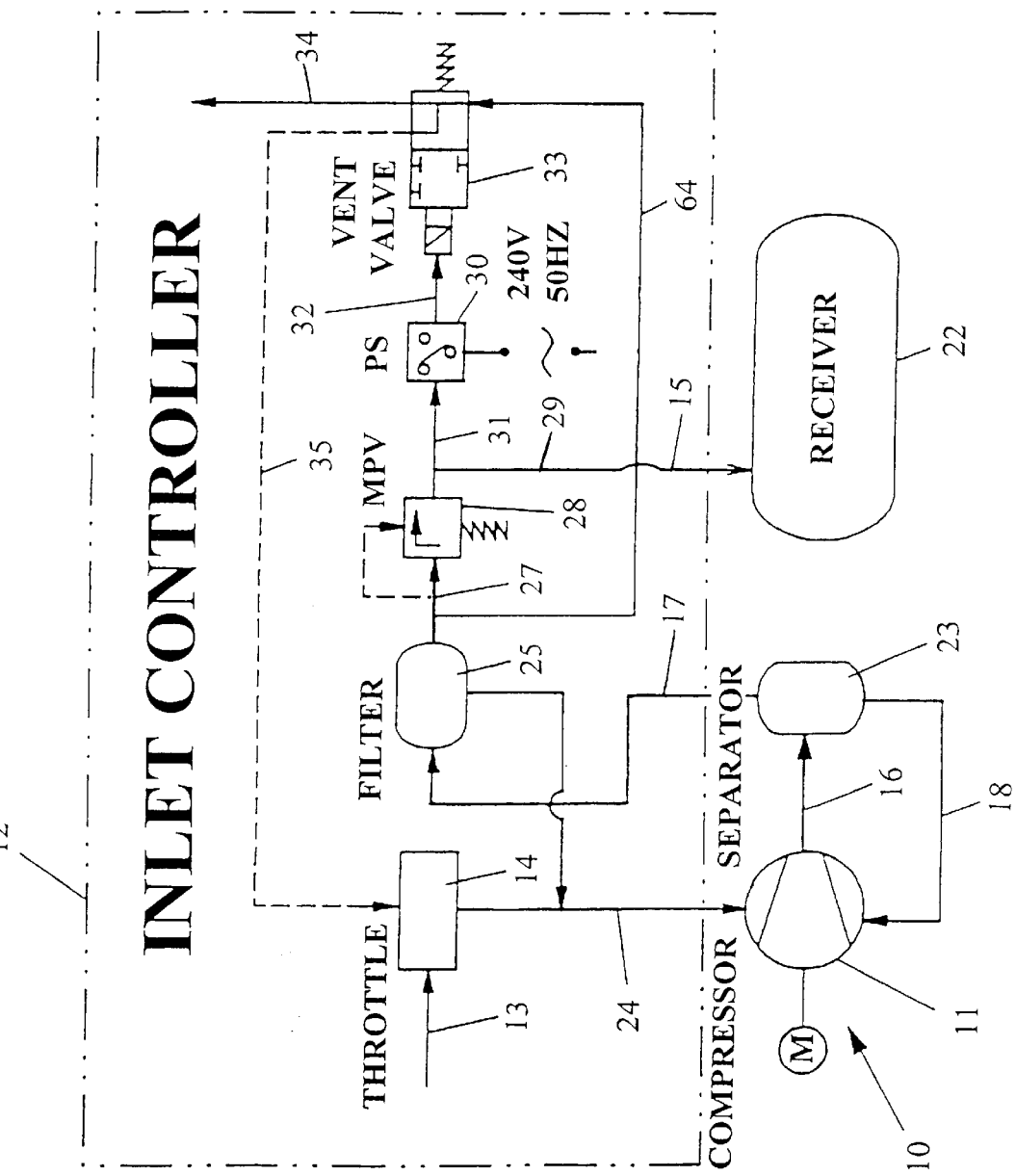
FIG. 1 is a schematic flow diagram of a compressor system utilising a control valve arrangement according to a preferred embodiment of the present invention.

Referring to FIG. 1, the flooded compressor system 10 comprises a screw compressor unit 11 driven by a motor M. An Inlet control valve arrangement 12 is provided which receives air to be compressed at 13 preferably via an inlet filter (not shown). The control valve arrangement 12 includes an inlet throttle valve 14 which directs air via a line or passage 24 to the compressor unit 11. Clean compressed air is discharged along line 15 to a receiver storage container 22. The screw compressor unit 11 discharges a mixture of compressed air and oil via a line 16 into a separator vessel 23. After a primary separation of compressed air from the oil in the separator vessel 23, the compressed air. (and some entrained oil droplets) is passed via a line 17 to a final filter assembly 25 (as described hereinafter) mounted from the main throttle valve 14. Separated oil from the separator vessel 23 is returned to the compressor unit 11 via line 18. An oil cooler and filter would normally be provided in this line or a thermal by-pass valve might be provided to bypass the cooler at certain stages of operation, if desired. The dean compressed air discharged from the filter assembly 25 is directed via communication means 27 into a minimum pressure valve (MPV) 28 forming part of the valve arrangement 12. The minimum pressure valve 28 remains closed until a minimum pressure achieved within separator vessel 23 is reached and thereafter the minimum pressure valve opens. With the minimum pressure valve 28 open, compressed air is directed via communication means 15 into the receiver 22 and this pressure is also directed onto a pressure switch (PS) 30 via a communication means 31. The pressure switch 30 acts to keep the discharged compressed air between predetermined upper and lower pressure limits, for example between six (6) and seven (7) bars. When the upper limit is reached, the pressure switch 30 opens to direct pressure via communication means 32 on to a vent valve (VV) 33 which acts to vent excess pressure by connecting line 64 with a vent line 34. At this time, the pressure of the compressed gas in line 34 may be communicated via communication means 35 back into the inlet throttle valve 14 which acts to close the throttle valve and inject pressurised air into the Inlet of the compressor unit 11. If desired a non-return valve might be provided In line 35.

Reference will now be made to FIGS. 2 to 5 of the accompanying drawings which illustrate various sectional views of preferred forms of control valve arrangements 12. In each embodiment the arrangement comprises a filter assembly 25 mounted to a support member 37. The member 37 comprising two plates or blocks 38 and 39 in which various passages and valve elements are located as described hereinafter. A diaphragm member 68 separates the plates or blocks 38 and 39 which also acts as a sealing gasket therebetween.

The filter assembly 25 includes an outer shell 46 which is cup shaped and configured to withstand the gas pressures for which the system is designed. The shell 46 is permanently or releasably secured in a sealing manner by any suitable means to the block 38 to define an enclosed space 80. An annular coalescent type filter element 81 is provided within the space 80 having annular walls of filter material through which compressed gas is adapted to pass. One end of the element 81 is fully closed by an end cap 82 and a second annular end 87 of the element 81 is sealed against the block 38 using a sealing gasket or the like 83. A spring 94 urges the element 81 into sealing engagement. It will of course be appreciated that any other form of sealing could be used (permanent or releasable) such that an outer space 84 and an inner space 85 is created from the enclosed space 80 such that gas can only flow between the inner and outer spaces through the filter material 86. Conveniently the shell or housing 46 is bolted or otherwise secured to block 38 to seal the housing 46 to the block in a manner enabling removal thereof for servicing the filter element 81 as may be desired. The bolts (not shown) may be employed to secure the housing 46 and the blocks 38, 39 together. Alternatively the housing 46 may include a screw thread arrangement at its mouth to enable it to be secured to the block 38. In the embodiment illustrated, compressed gas and entrained liquid droplets is received via line 17 by an inlet connection 88 leading to a semi circular manifold 89 in the block 38. This gas and liquid flows into the space 84 and through the filter material 86 to remove the liquid droplets therefrom. Clean compressed gas is then removed from the inner space 85 via an extension tube 90 and an outlet passage 91 within the block 38. The minimum pressure valve 28 is located in this discharge passage 91. The valve 28 is closed by a piston member 53 being urged by a spring 54 against a valve seat around passage 91. When the minimum pressure is reached, the piston 53 moves against the force of the spring 54 and pressurised gas flows into a passage 55 (see FIGS. 4 or 6) and thereafter into the discharge line 15. At the same time the passage 55 is communicated through a passage 92 in block 38 to the pressure switch 30. The pressure switch 30 opens at a lower predetermined pressure (e.g. six bars) and closes at an upper predetermined pressure (e.g. seven bars). At the upper predetermined pressure level, the vent valve 33 opens passage 64 from the discharge passage 91 to vent the pressurised gas.

Figure 3:
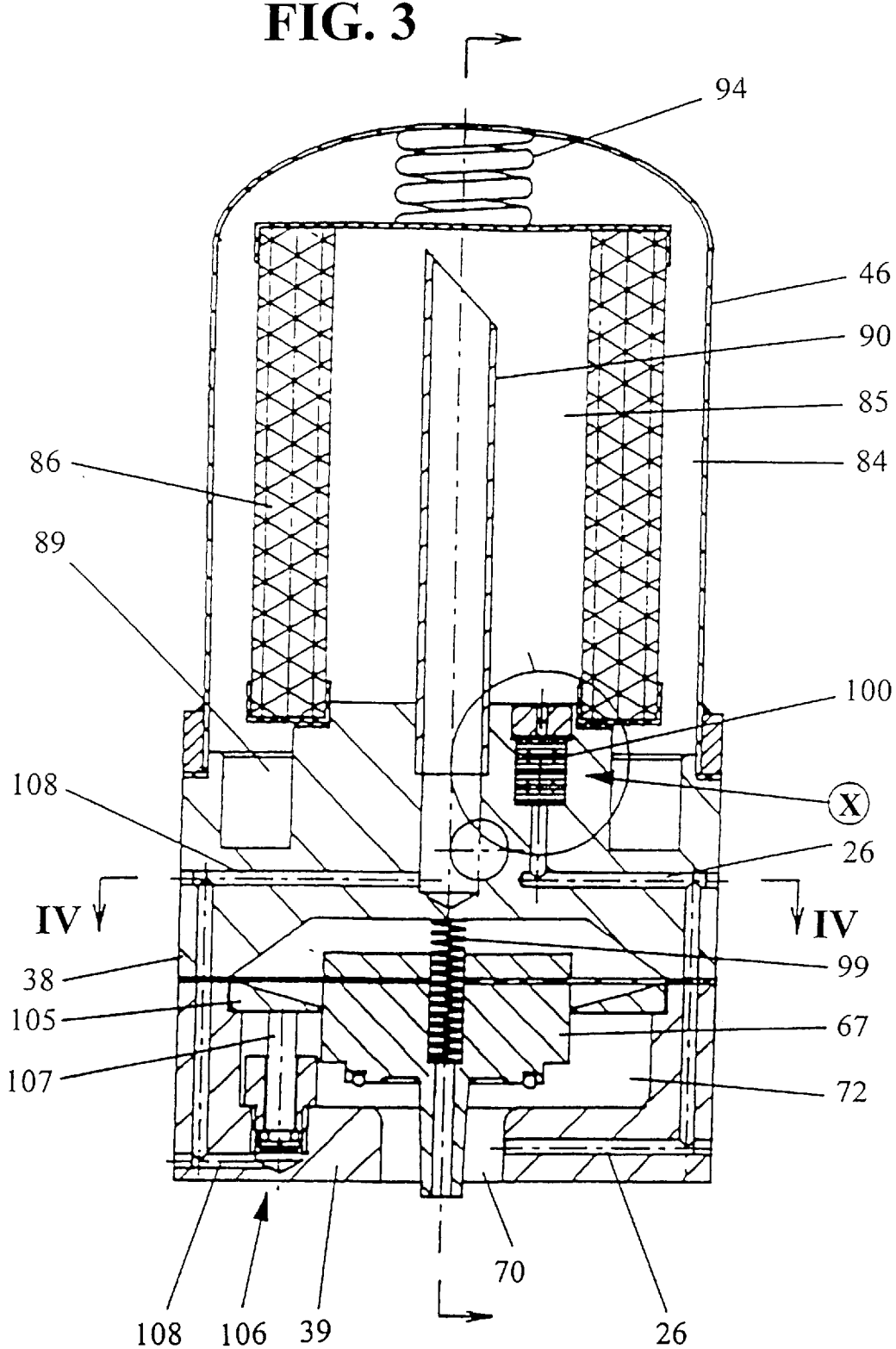
FIG. 3 is a longitudinal cross-sectional view of the control valve of FIG. 2 taken along line III—III.
Figure 3A:
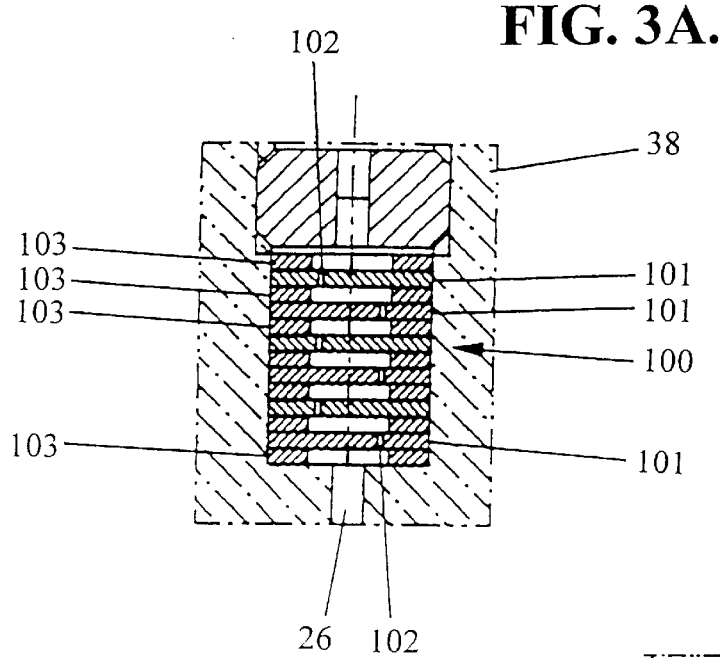
FIG. 3A is a detailed cross-sectional view of the area X shown in FIG. 3.
Figure 5:
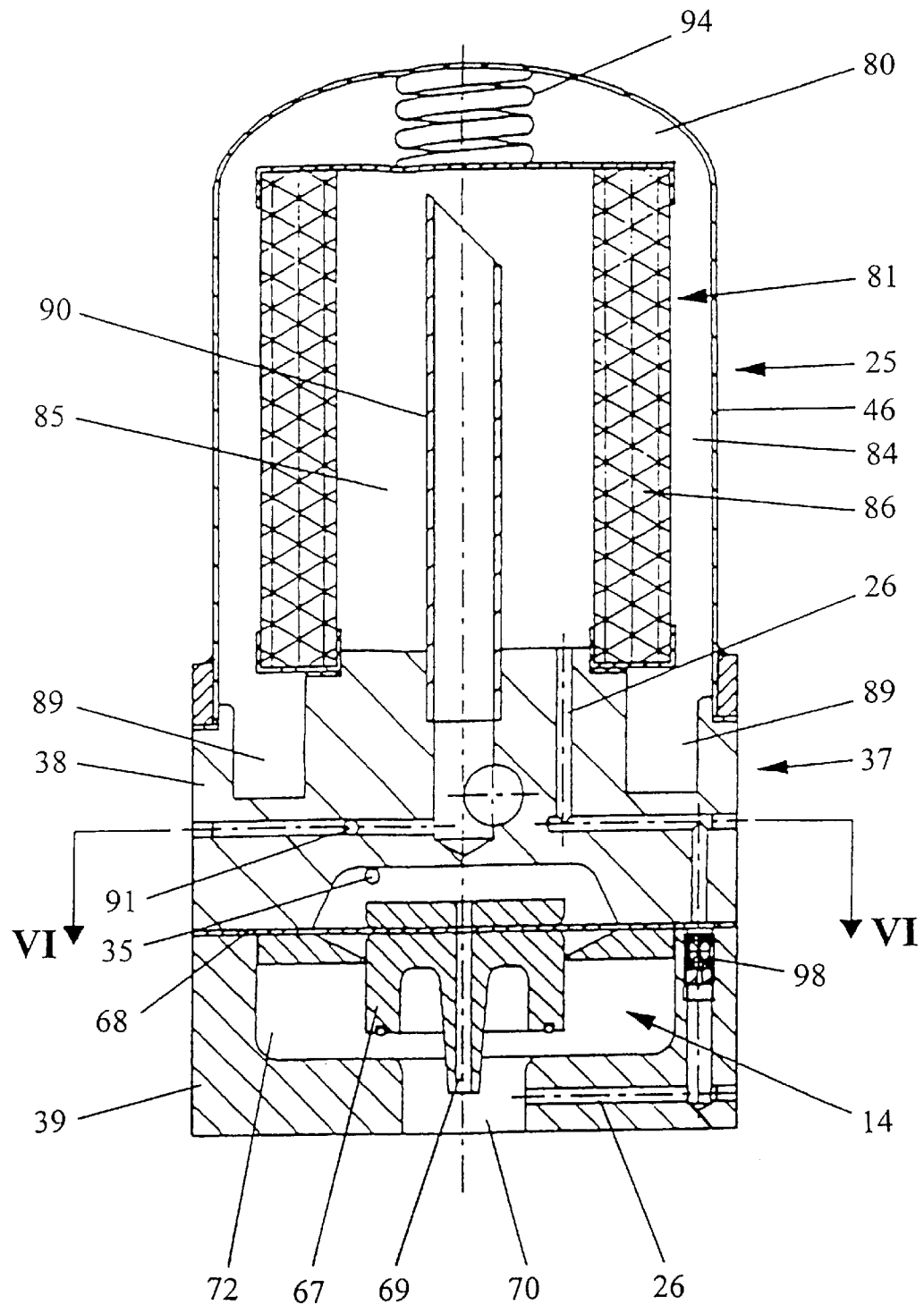
FIG. 5 is a longitudinal cross-sectional view similar to FIG. 3 of a further embodiment of a control valve according to the present Invention.

The main throttle valve 14 comprises a valve member 67 supported by the diaphragm 68 to move upwardly and downwardly. A spring member 99 is provided to urge the member 67, however, it should be appreciated that the spring member 98 is not essential. A reduced diameter conduit 69 communicates the chamber 66 above the member 67 to the inlet zone 70 leading via line or passage 24 to the compressor unit 11. At start up or unloaded operation the valve member 67 rests on a valve seat 71 surrounding the inlet zone 70 so that this communication zone is closed. In consequence, vacuum conditions are rapidly built up in the zone 70 which is communicated to the chamber 66 above the diaphragm. Because of the differential areas above and below the member 67, the member 67 then lifts off the valve seat against the force supplied by the spring 98 and air is introduced via passage 13 into chamber 72 and thereafter via zone 70 into the inlet passage 24. As can best be seen in FIGS. 3 and 5, a conduit 26 communicating with the base of the inner zone 85 of the filter assembly 25 is provided to drain oil collected in this base back into the inlet of the compressor unit 11. As shown in FIG. 5, a valve device 98 may be provided in the passage 25. Alternatively, a simple construction may be used, however, both have the disadvantage that the relatively small openings may become blocked in use. As shown in FIGS. 3 and 3A, large passage dimensions can be maintained by using a labyrinth restrictor device 100 comprising a plurality of plates 101 each with a flow opening 102 and separated by gasket rings 103. Thus oil is prevented from building up in the filter assembly 25 to adversely affect the coalescent type filter element therein.

Figure 4:
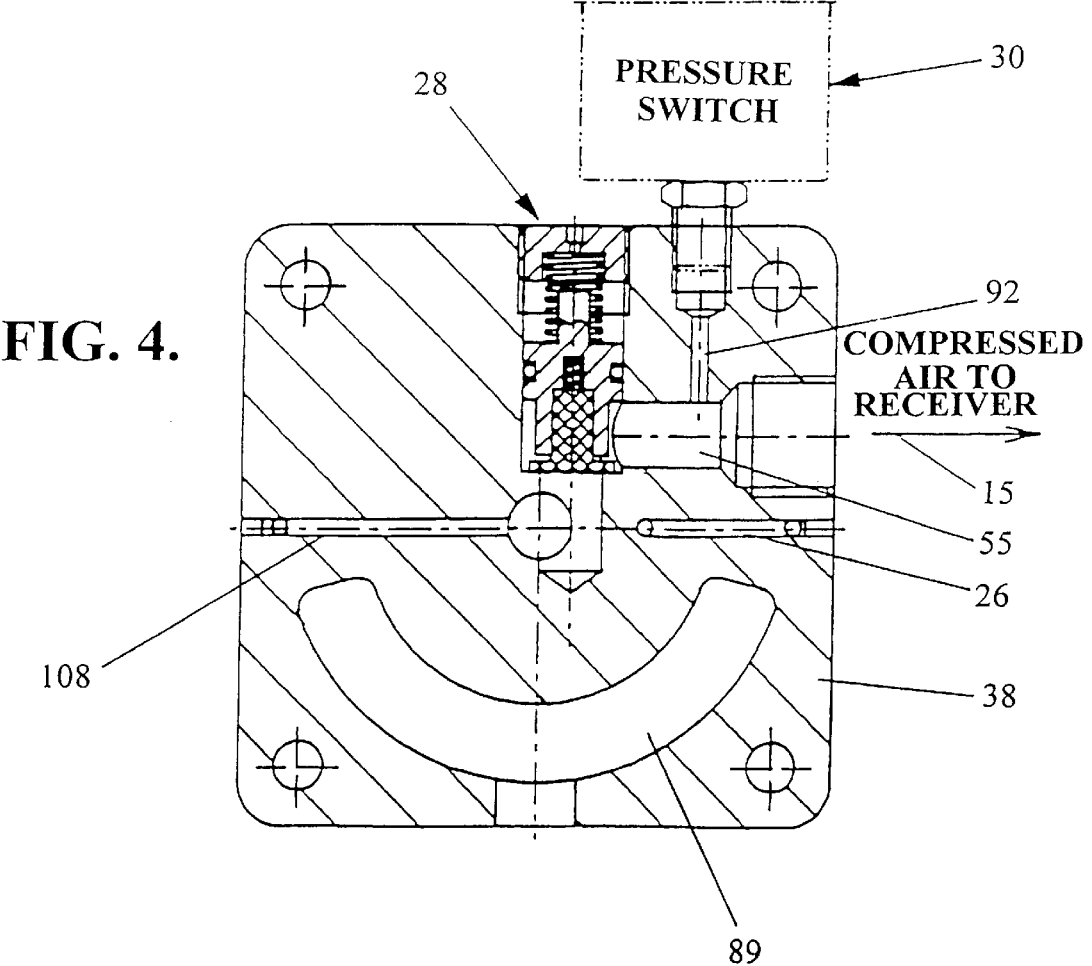
FIG. 4 is a cross-sectional view taken along line IV—IV of FIG. 3.

FIGS. 3 to 4 of the accompanying drawings show an embodiment intended for stop/start operation. In this arrangement, when the pressure of the clean gas discharged to line 15 has reached a set upper limit, the pressure switch 30 senses same and stops the motor M driving the compressor. When the pressure sensed by the pressure switch 30 drops to a preset lower level, the motor M is re-started to drive the compressor 11. When the compressor is stopped, the spring 99 acts to seat the member 67 so as to close the inlet zone 70. Consequent upon this movement, the diaphragm 68 also moves downwardly to force its loose support ring 105 downwardly so that a downward force acts on the valve stem 107 of a poppet valve 106 to open this valve. As a result, pressurised gas is led from the clean gas inner zone 85 via passage 108 through the valve 106 into the zone 72 and ultimately to atmosphere via the inlet 13.

Figure 6:
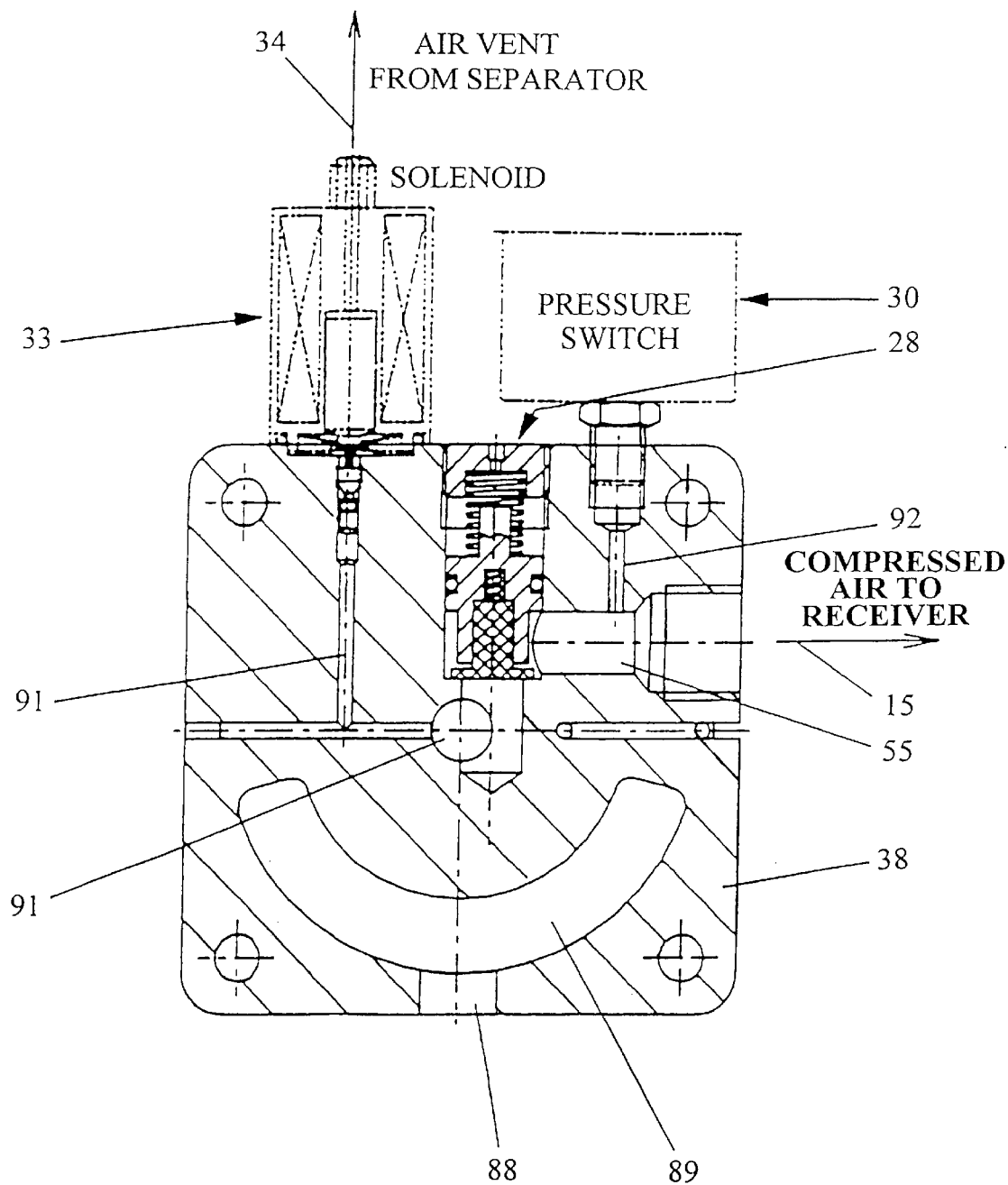
FIGS. 6 and 6A are cross-sectional views taken along line VI—VI of FIG. 5 showing different embodiments.
Figure 6A:
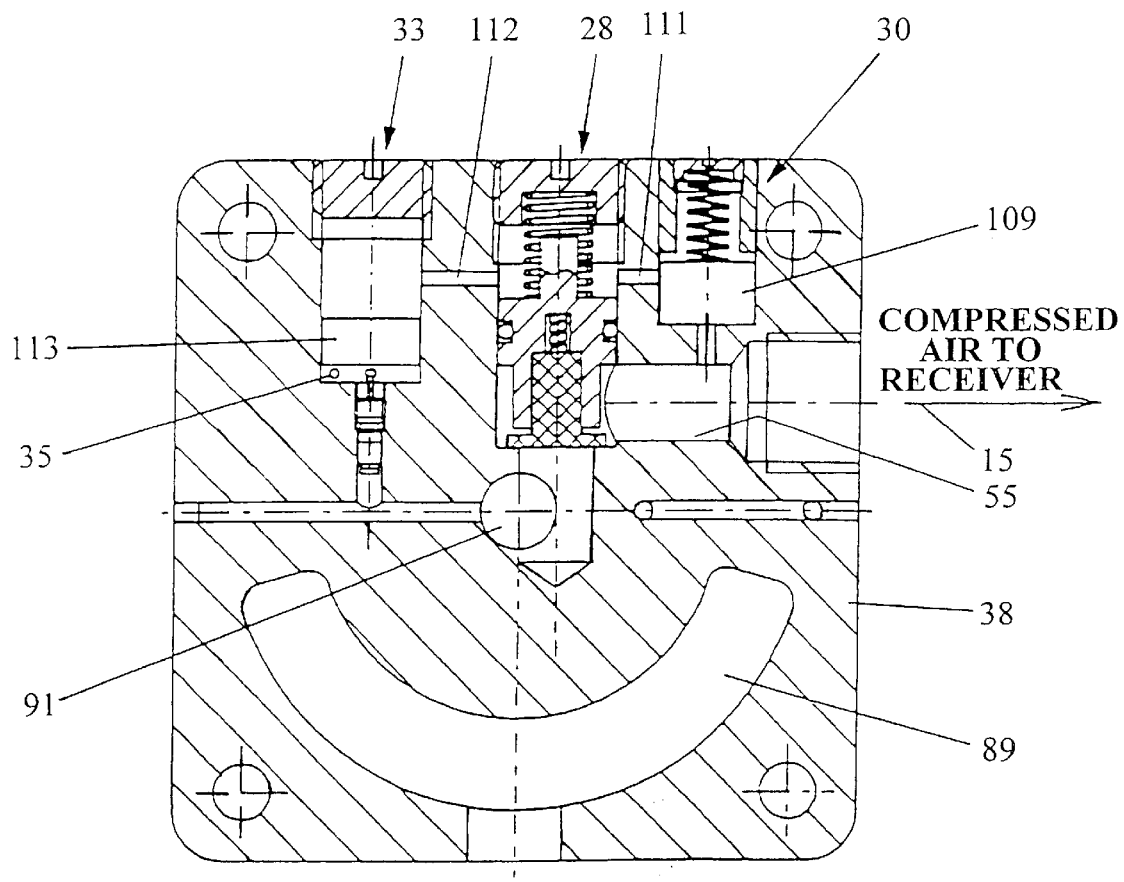

FIGS. 5, 6 and 6A illustrate further alternative embodiments. In these embodiments, when the pressure of the gas in the receiver 22 has built up to the desired predetermined upper level, this pressure is, as discussed above, vented via the vent valve 33 and some of this pressurised air is applied to the chamber 66 via the passage 35 and also some of this air is introduced into the inlet passage 24 via the conduit 69. The pressure in the chamber 66 causes the valve member 67 to close thereby preventing entry of atmospheric air from valve inlet 13 into the compressor inlet 70 and at the same time pressurised air is injected into the compressor inlet 70 to prevent the compressor compressing what air remained in the inlet over high imposed compression ratios. As is described in UK Patent No. 0,130,662, this prevents excessive noise levels and excessive power loss during unloaded running.

FIG. 6A illustrates a further alternative where the pressure switch 30 and air vent valve 33 are formed as valves functioning in the block 38 rather than as separate attached devices as depicted in FIG. 6. In this case, when the discharge pressure in outlet 55 reaches the set upper limit, this is communicated to piston 109 in a pilot valve acting as pressure switch 30. This pressure is sufficient to lift the piston 109 against the spring 110 and this pressure is communicated via passage 111 to the top of the minimum pressure valve 28 to close this valve and simultaneously via passage 112 to the top of the piston 113 in the vent valve 33. This moves the piston 113 downwardly so that projection 114 opens a normally closed valve 115 so that pressurised gas from the passages 91 pass to passage 35 and into the chamber 66 to close the throttle valve member 67 against seat 71. At the same time the pressurised gas is vented to atmosphere.

Figure 2:
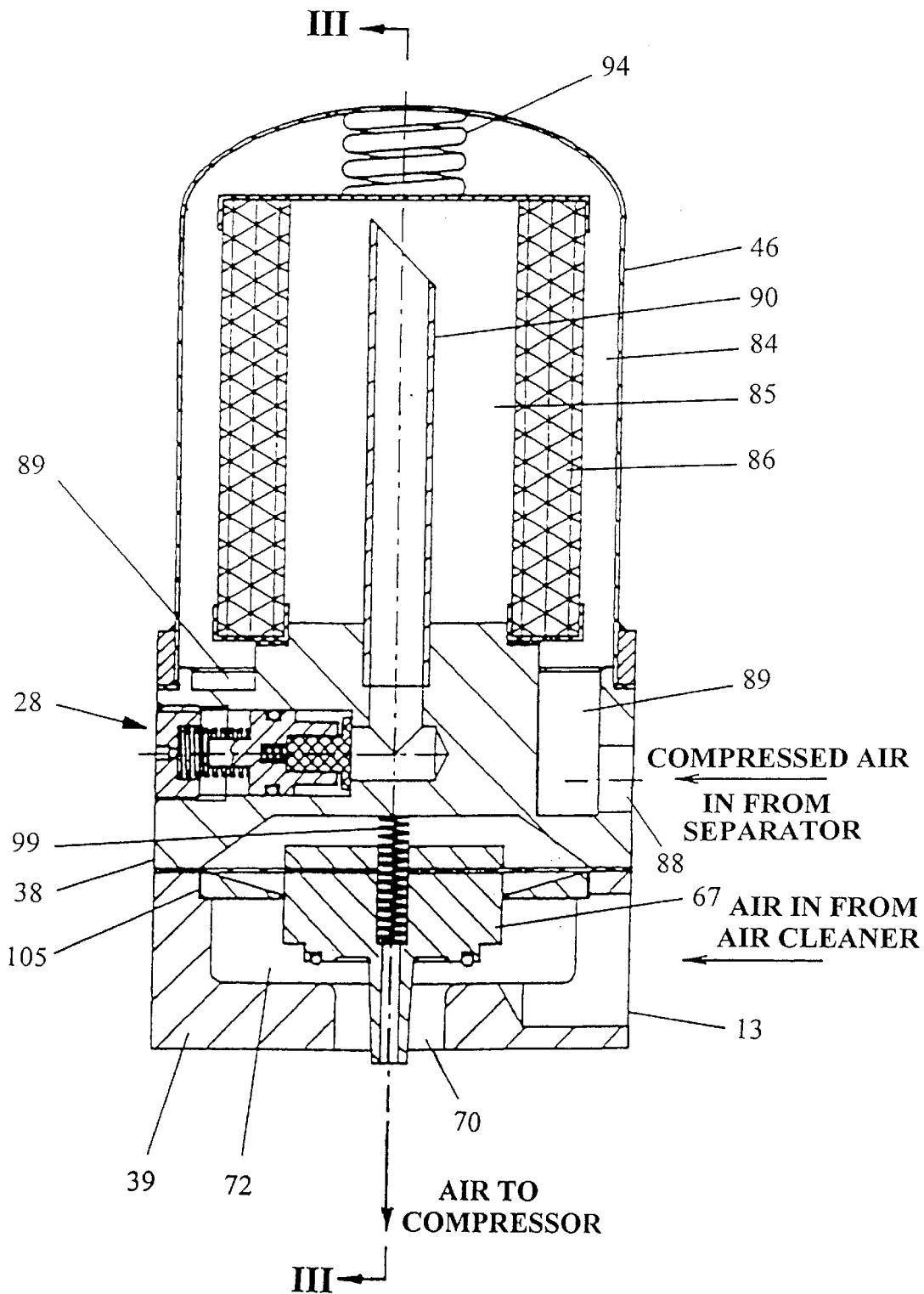
FIG. 2 is a longitudinal cross-sectional view of an embodiment of a control valve capable of use in a system similar to FIG. 1 intended for stop/start operation and for mid power range compressors, typically of the order of five to ten horsepower.
Figure 7:
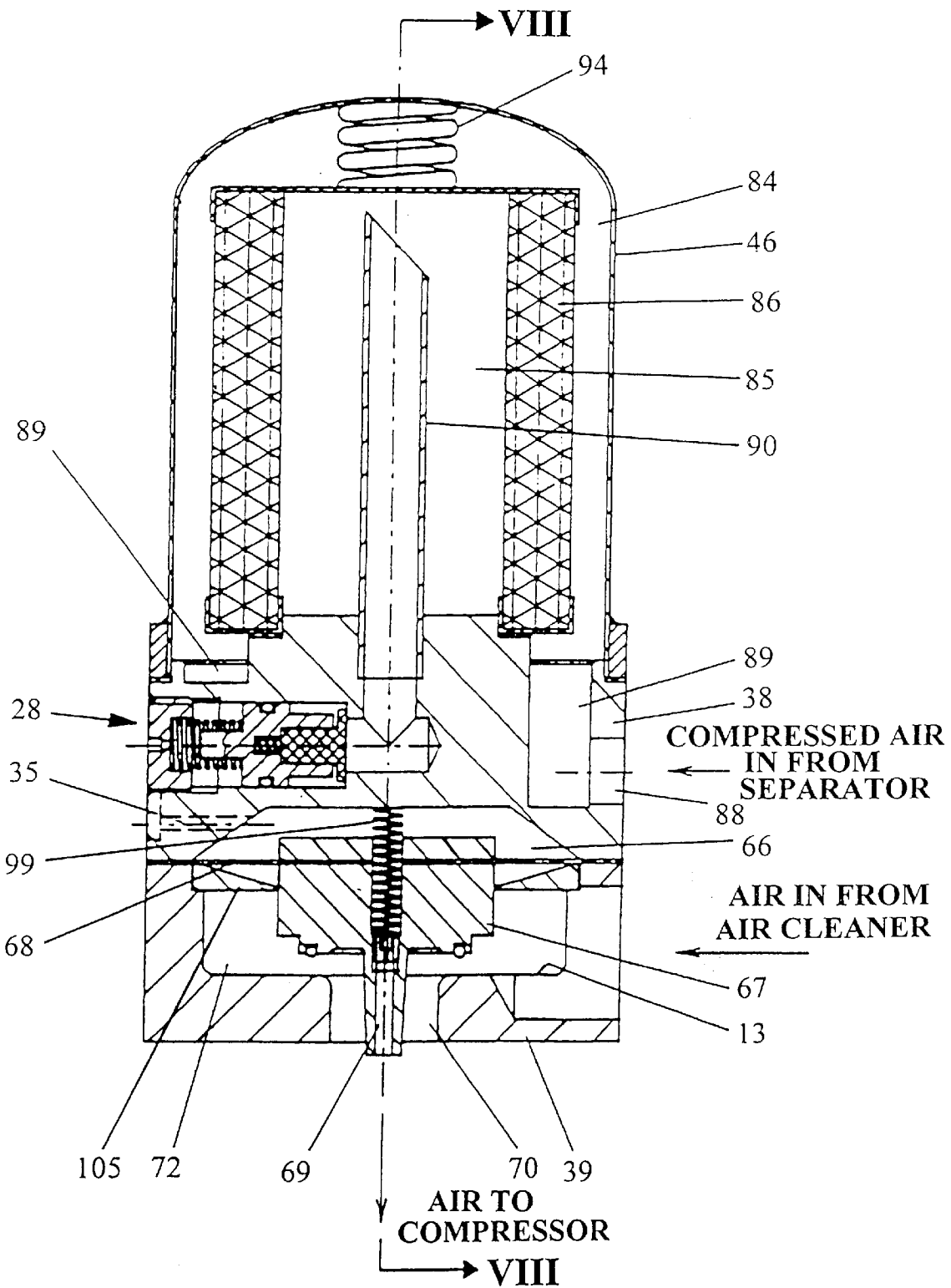
FIG. 7 is a longitudinal cross-sectional view of a still further preferred embodiment of a control valve capable of use in a system similar to FIG. 1 intended for continuous operation and for mid power range compressors, typically of the order of five to ten horsepower.
Figure 8:
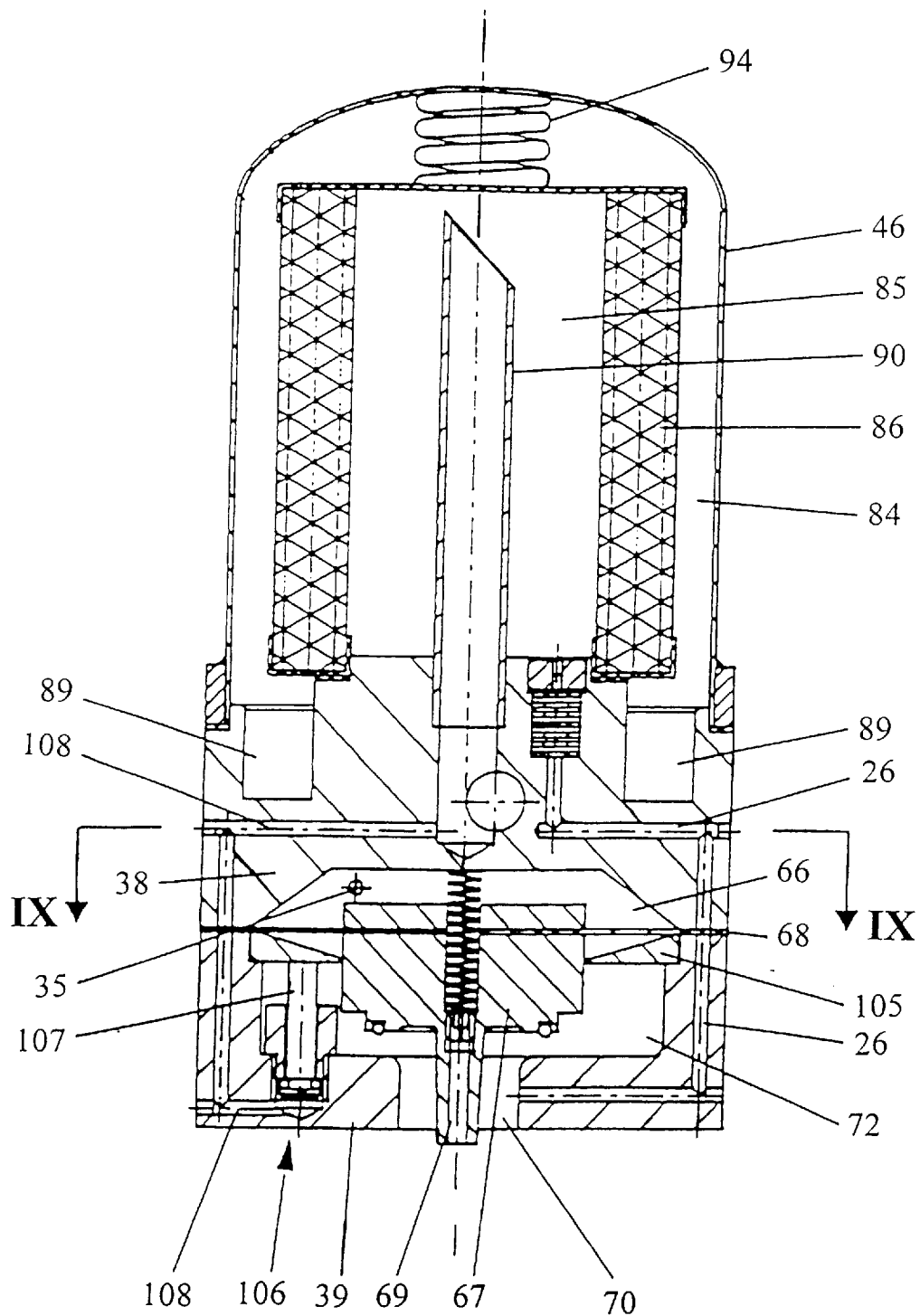
FIG. 8 is a longitudinal cross-sectional view taken along line VIII—VIII of FIG. 7.
Figure 9:
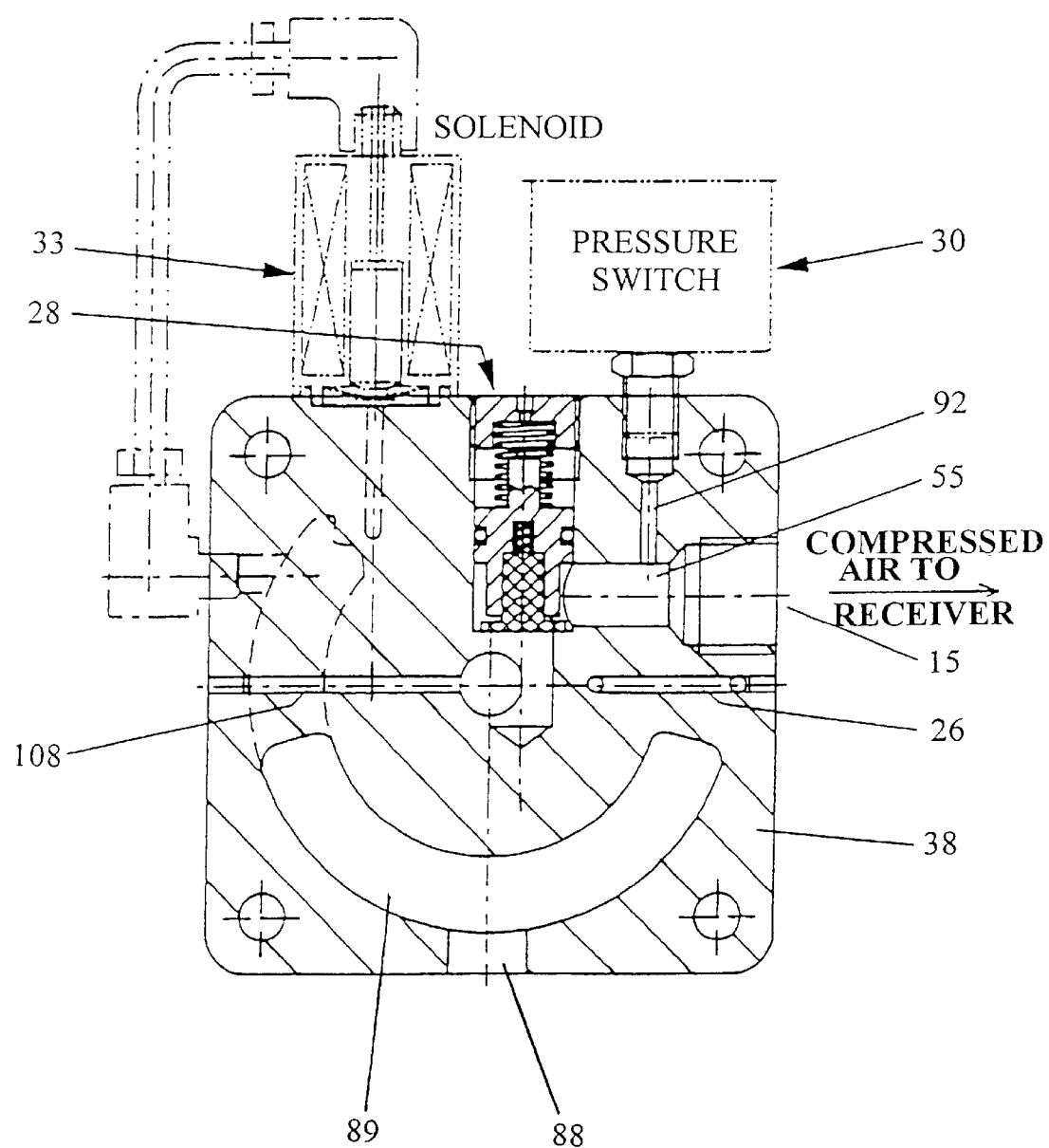
FIG. 9 is a cross-sectional view taken along line IX—IX of FIG. 8.
Figure 10:
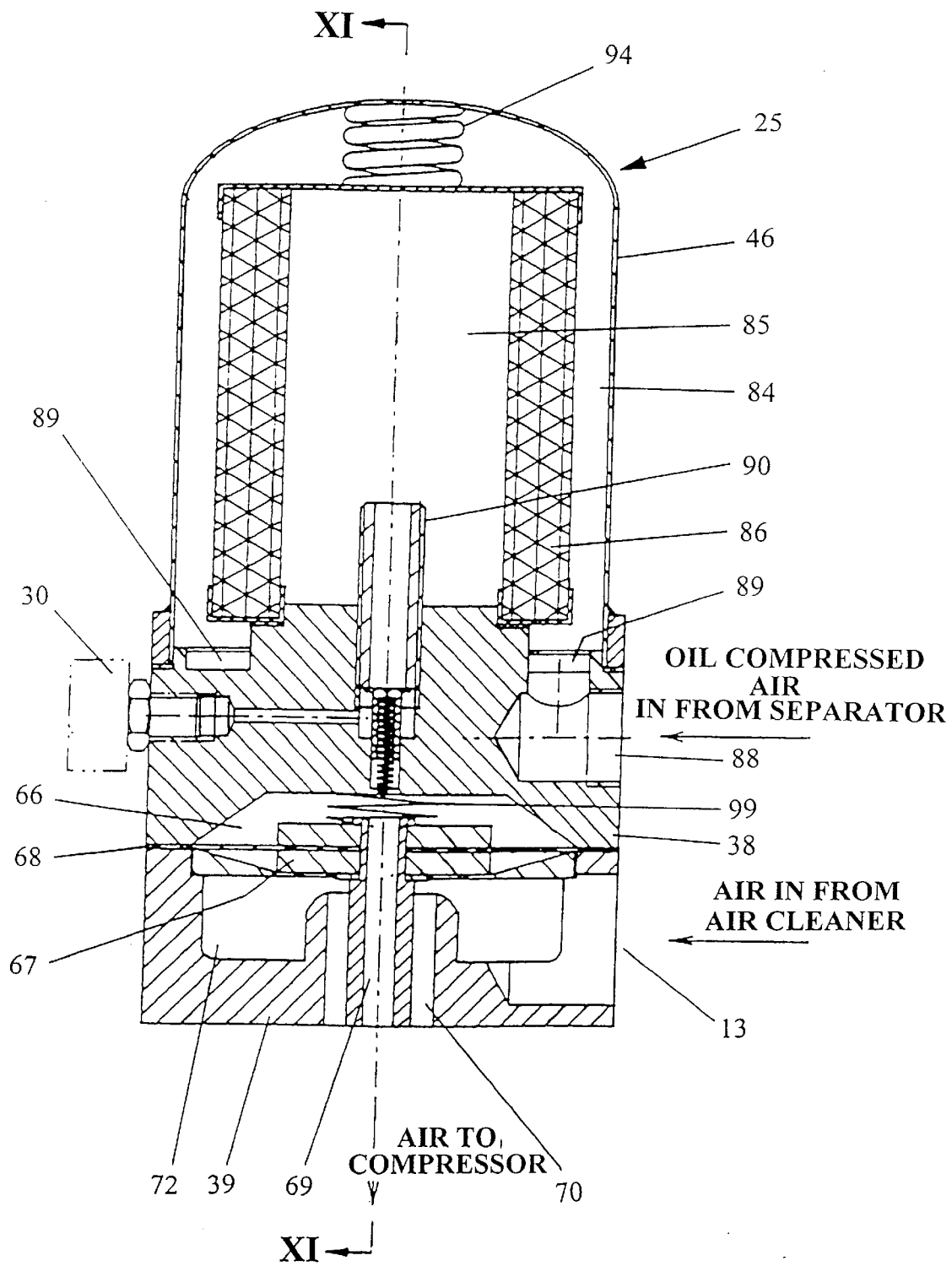
FIG. 10 is a longitudinal cross-sectional view of a still further preferred embodiment intended for stop/start operation of low powered compressors, typically of the order of up to about five horsepower.
Figure 11:
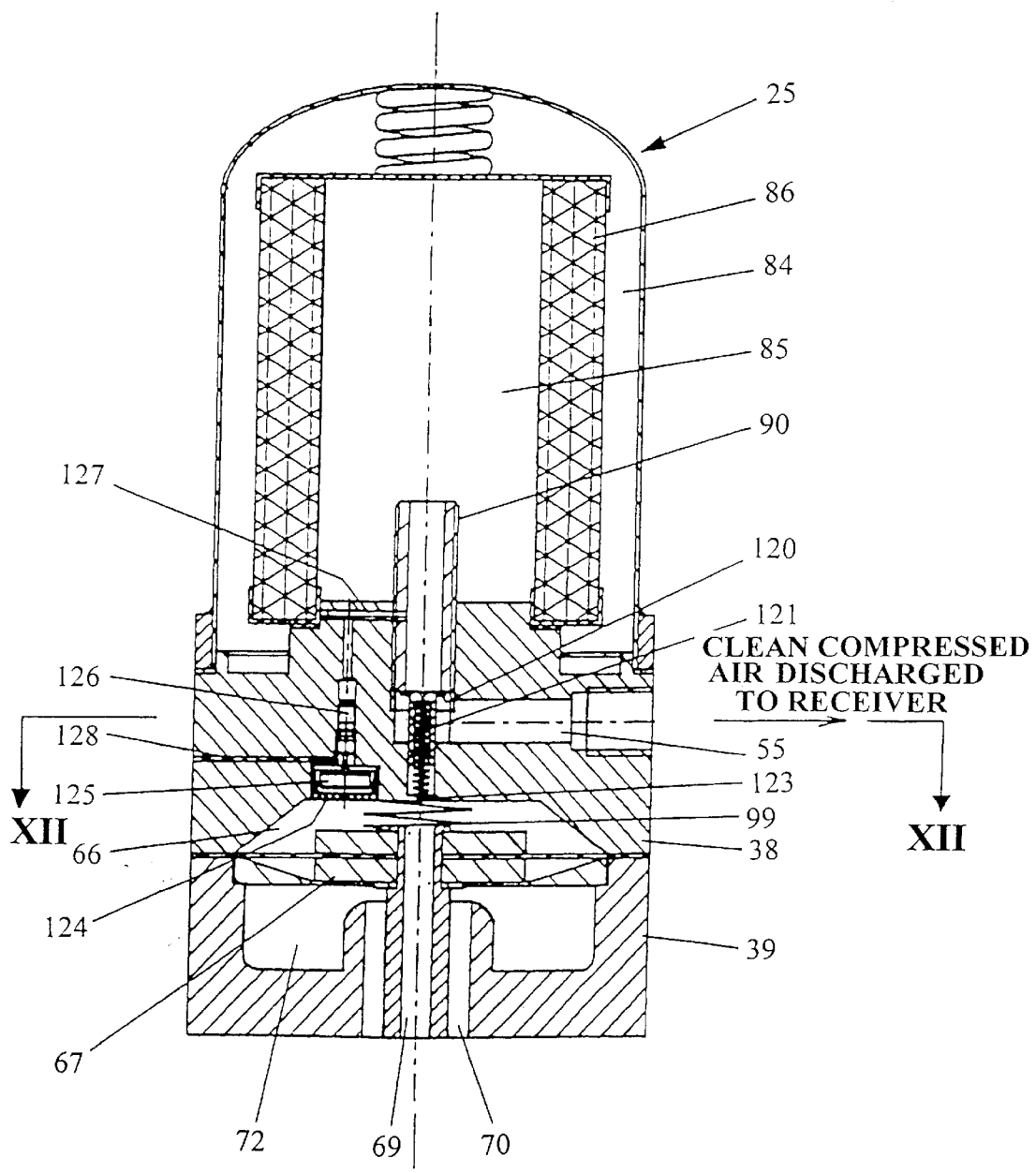
FIG. 11 is a longitudinal cross-sectional view taken along line XI—XI of FIG. 10.
Figure 12:
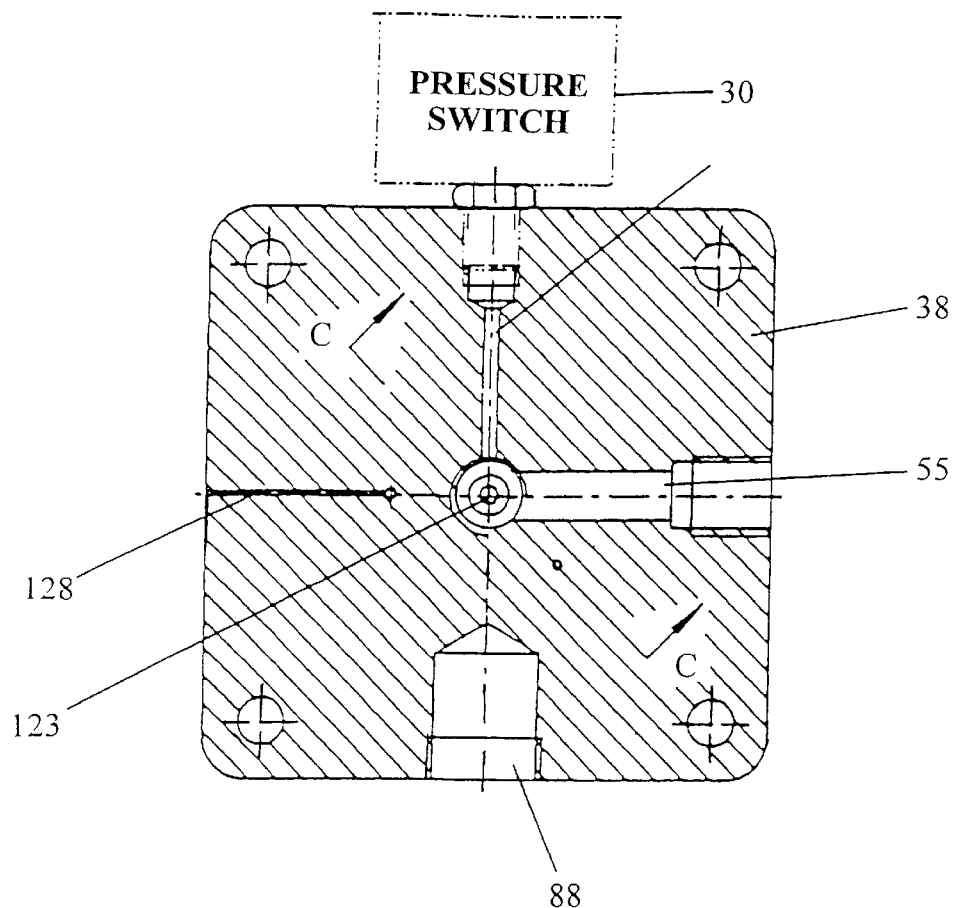
FIG. 12 is a cross-sectional view along line XII—XII of FIG. 11.

FIGS. 7 to 9 of the accompanying drawings show a further alternative similar to FIGS. 2 to 4 but in this case adapted for continuous operation. Reference numerals used in the preceding discussion identify the same features in FIGS. 7 to 9.

Figure 13:
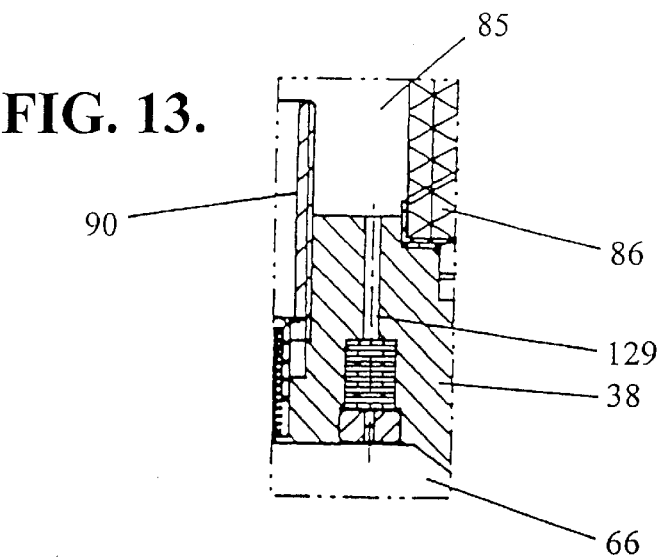
FIG. 13 is a partial cross-sectional view along line C—C of FIG. 12.

FIGS. 10 to 13 illustrate a simplified control arrangement intended for use on low horsepower compressor systems (typically up to five horsepower) operated on a start/stop basis. Again, reference numerals used in the preceding discussion identify similar features in this embodiment. In operation, at start up, the member 67 is urged by the spring 99 against the associated valve seat thereby closing the inlet zone 70. Vacuum conditions are rapidly created in the zone 70 which is communicated along passage 69 to the region 66 above the diaphragm 68. As a result, the diaphragm 68 and member 67 rise to allow air from the inlet 13 into the inlet zone 70 to be compressed. In this embodiment, a simple minimum pressure valve 28 is built into the block 38 beneath the dean compressed air pipe 90, the valve 28 comprising a valve member 120 urged by a spring 121 against the base of the pipe 90. When a minimum pressure is attained in the zone 85, the valve member 120 moves against the spring 121 to allow discharge of the compressed gas along the pipe 90, past the valve member 120 to the discharge passage 55 and line 15. The pressure in the discharge pipe 90, when the valve member 120 is open is also communicated via a passage 122 to a pressure switch 30. When the pressure reaches an upper predetermined level, the pressure switch 30 is activated to stop the motor M driving the compressor unit. Pressure from the filter inner zone 85 is communicated via the pipe 90 and an opening 123 to the region 6 6 above the diaphragm 68. As a result, the valve member 67 immediately seats to close the inlet zone 70 and this elevated pressure is applied to an elastomeric cup diaphragm 124 which raises a piston device 125 to open a simple tyre type valve 126 to allow venting of compressed air from the zone 85 along passage 127 to a vent line 128 in the block 38. This pressure drops until a lower set level of the pressure switch 30 is reached whereupon the motor is re-started and the cycle is repeated. FIG. 13 illustrates a simple oil purge line 129 which passes through a labyrinth type restrictor device 130 (similar to that shown in FIG. 3A) to pass oil collected in the base region of the inner filter zone 85 into the region 66 and from there via passage 69 into the inlet zone 70 for the compressor 11.

Figure 14:
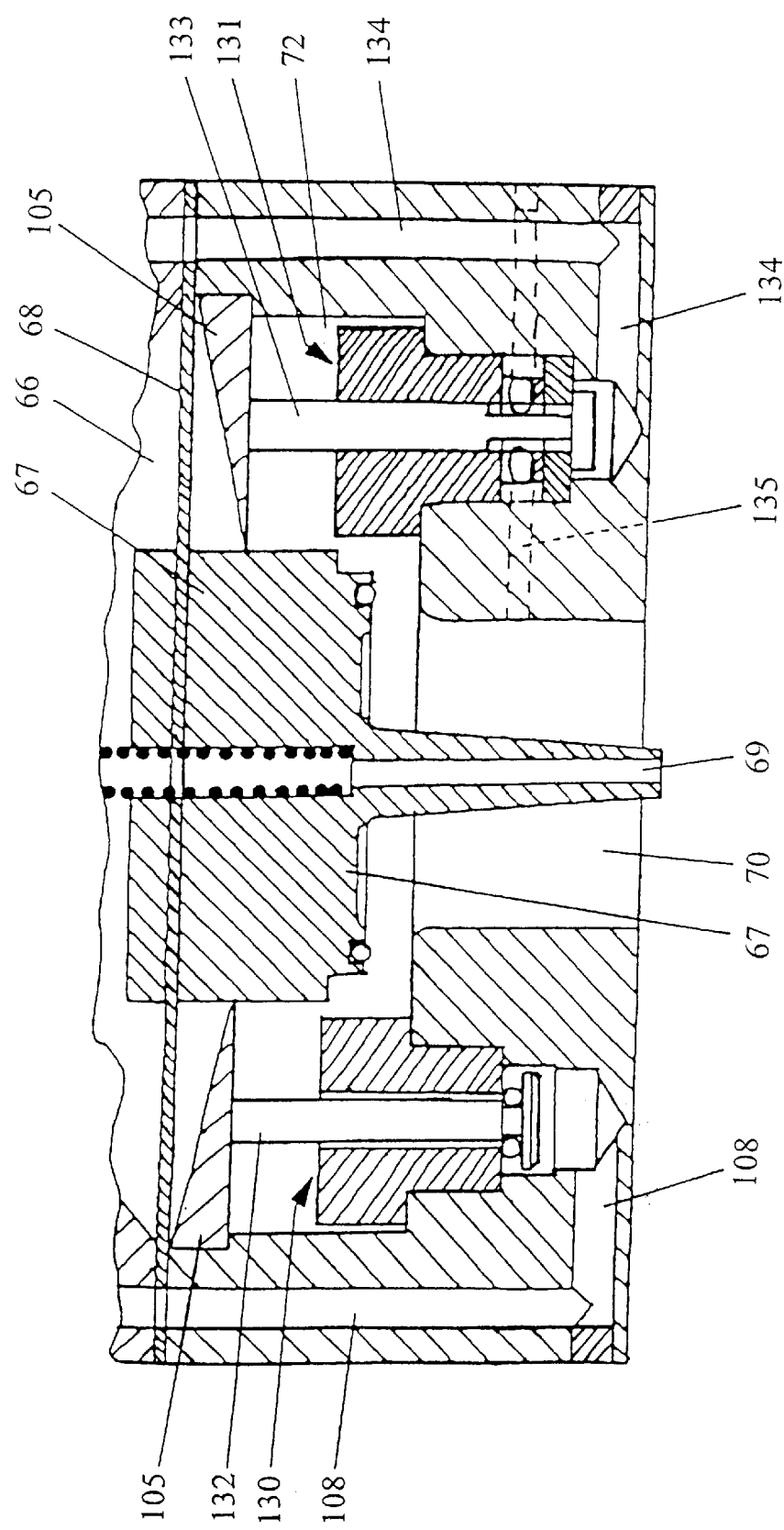
FIG. 14 is a part cross-sectional view of a still further preferred embodiment intended for use with higher powered compressors.
Figure 15:
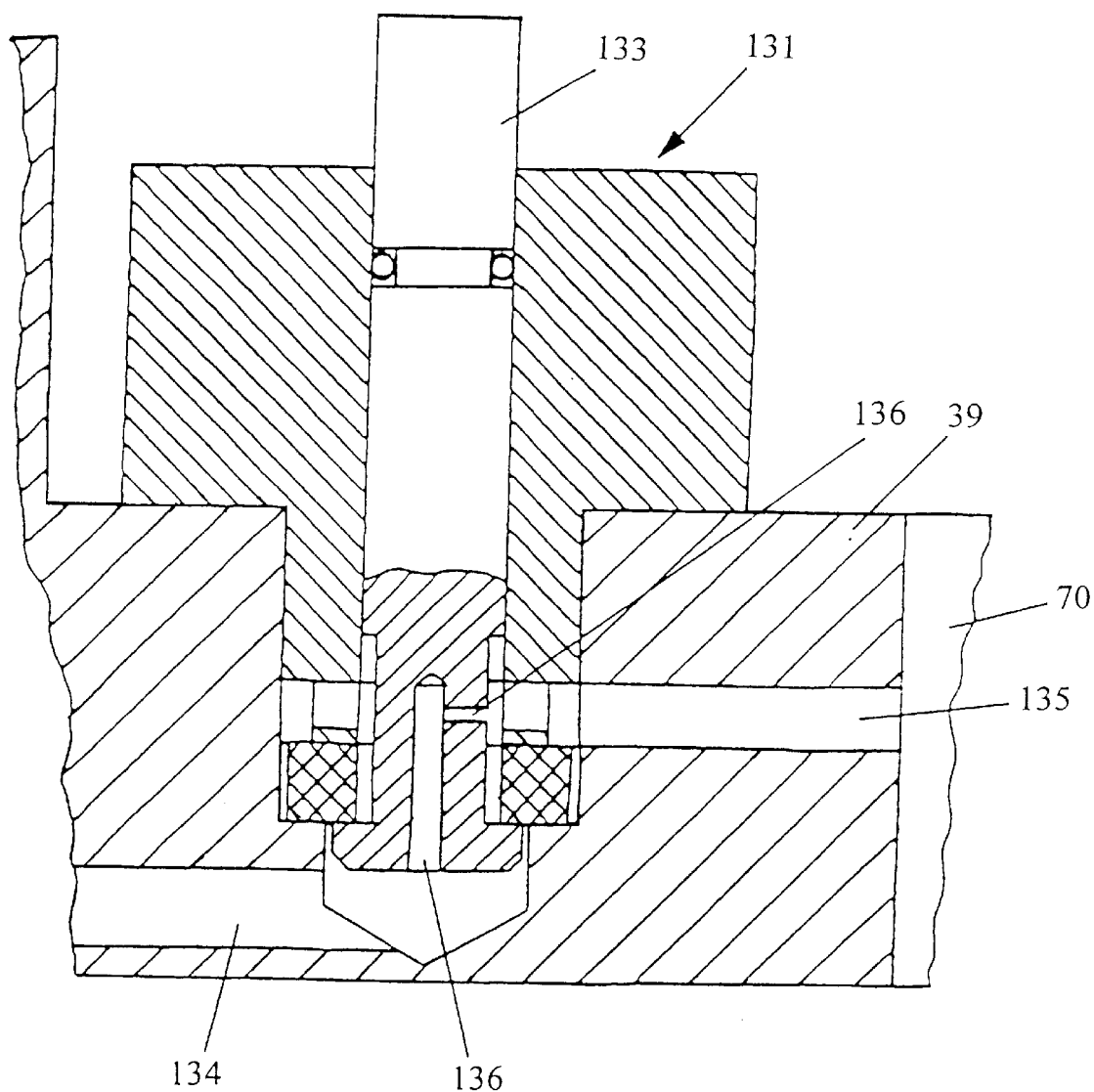
FIG. 15 is a detailed part cross-sectional view showing a still further alternative arrangement.
Figure 16:
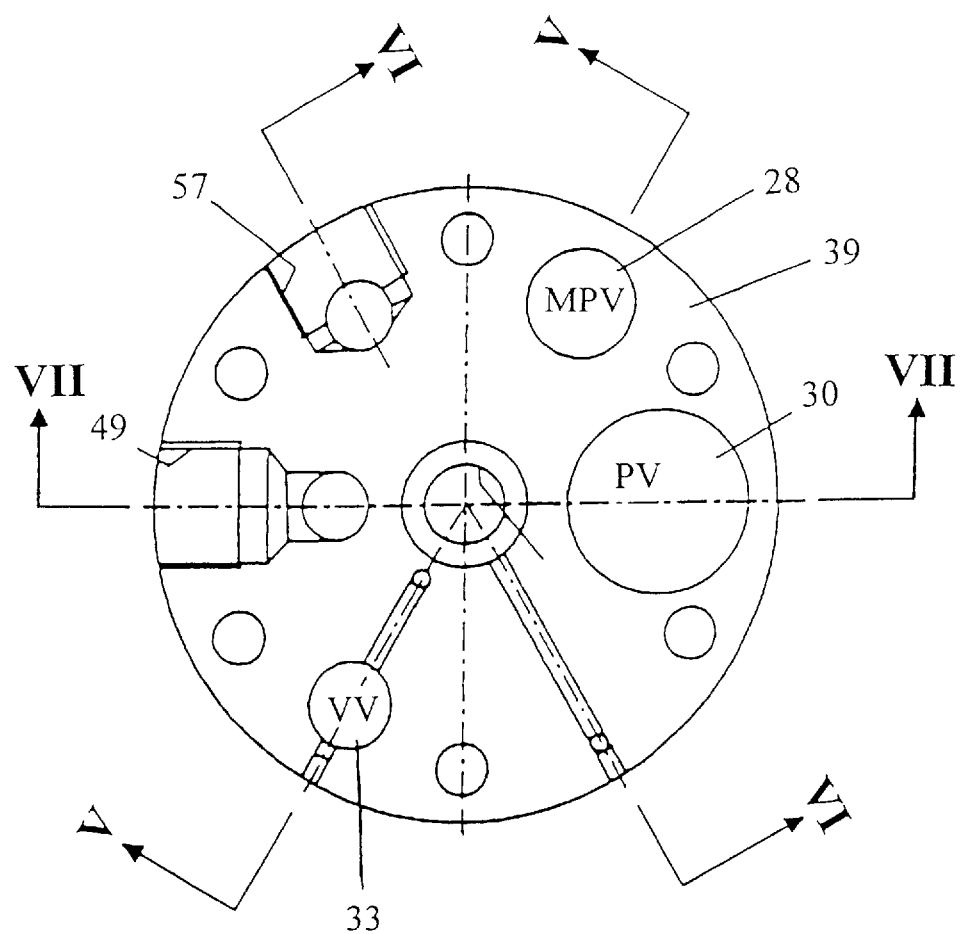
FIG. 16 is a cross-sectional view taken along lines III—III of FIG. 17 showing a further alternative form of control valve arrangement in accordance with another preferred embodiment of the present invention.
Figure 17:
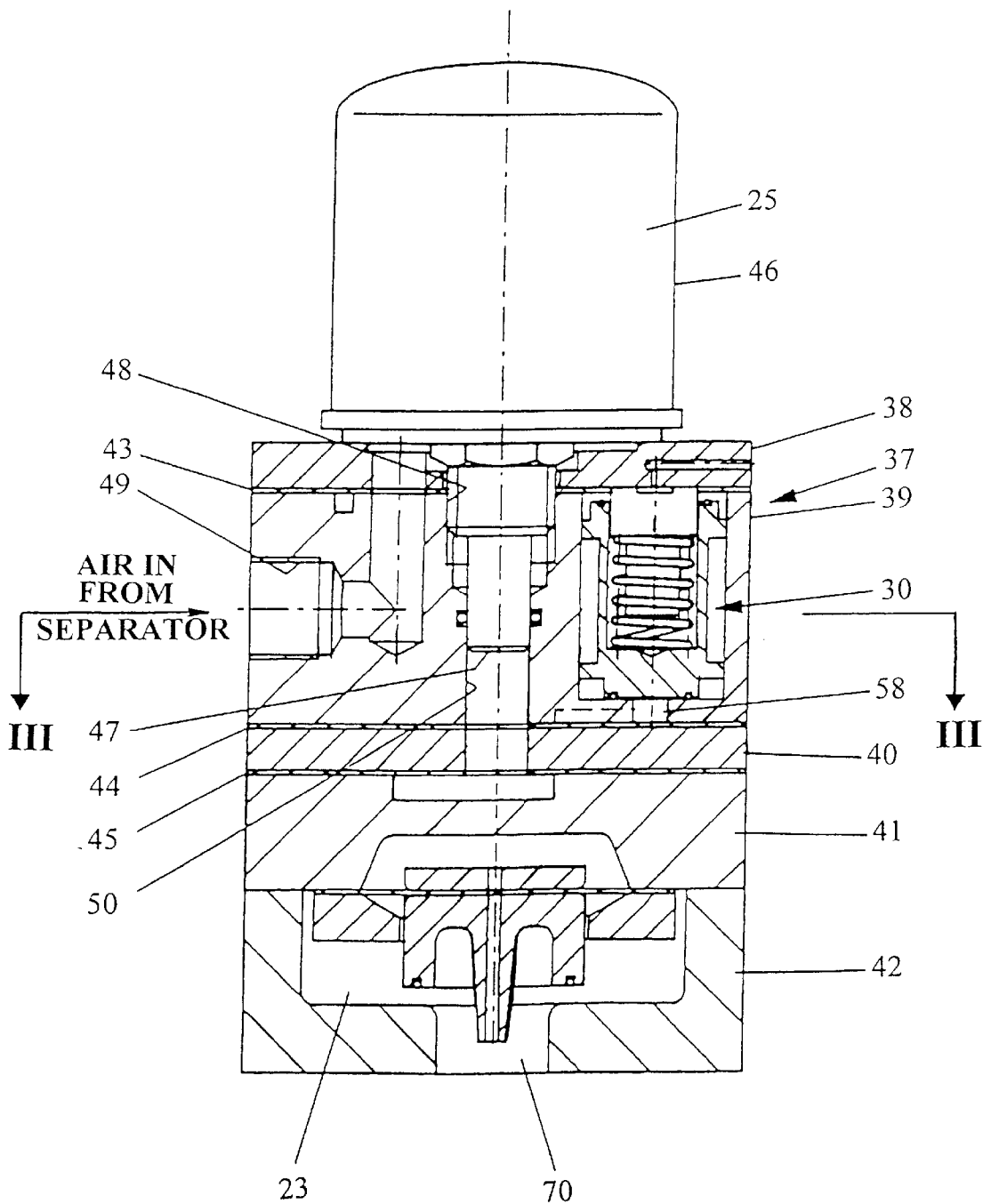
FIG. 17 is a cross-sectional view taken along line VII—VII of FIG. 16.

FIGS. 14 and 15 illustrate still further embodiments adapted for use in relation to higher powered compressors, for example 30 horsepower compressors. In this embodiment, features not illustrated may be as disclosed in any of the previously discussed embodiments. As shown in FIG. 14, a pair of poppet type valves 130 and 131 are employed, mounted in the block 39, with their valve stems 132, 133 being moved downwardly by movement of the free diaphragm support ring 105 downwardly under action from the diaphragm 68, when the valve member 67 is seated to close the inlet zone 70. In this condition, the valve 130 is open and the compressed gas is discharged via the passage 108 through the region 72 to the intake 13. Similarly, compressed gas is led via passage 134 through valve 131 to be injected via passage 135 into the inlet zone 70 for the reasons previously explained. FIG. 15 illustrates a further alternative in that the valve 131 might be further modified to both allow injection of pressurised air into the zone 70 when the valve member 67 closes and to permit a continuous purging of oil from the base of the inner filter zone 85 along the same passage, thereby minimising fabrication costs. In this case, passage 134 provides both the means for communicated pressurised air but also the oil drain or purge line. The valve stem 133 in this case is modified to have a narrow bore passage 136 continuously open to drain oil into the inlet zone 70.

Reference will now be made to FIGS. 16 to 21 of the accompanying drawings which illustrate various sectional views of a further preferred form of control valve arrangement 12. The arrangement comprises a filter assembly 25 mounted to a valve housing 37. The valve housing 37 comprises a plurality of plates or blocks 38, 39, 40, 41 and 42 in which various passages and valve elements are located as described hereinafter. At least the upper plates or blocks are separated by gasket members 43, 44 and 45 which also may include holes, passages or the like as required and as described hereinafter.

Figure 18:
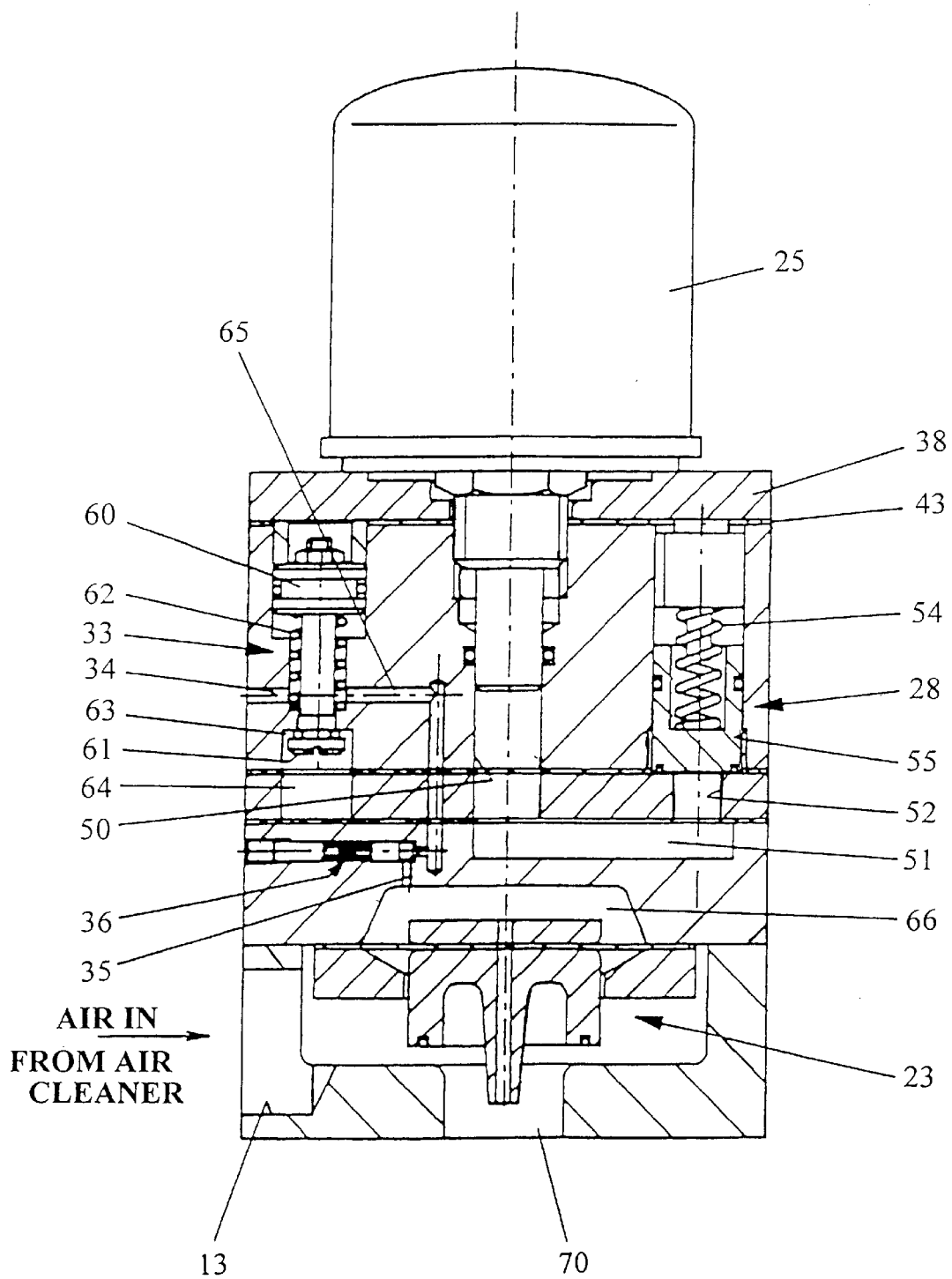
FIG. 18 is a cross-sectional view taken along line V—V of FIG. 16.
Figure 19:
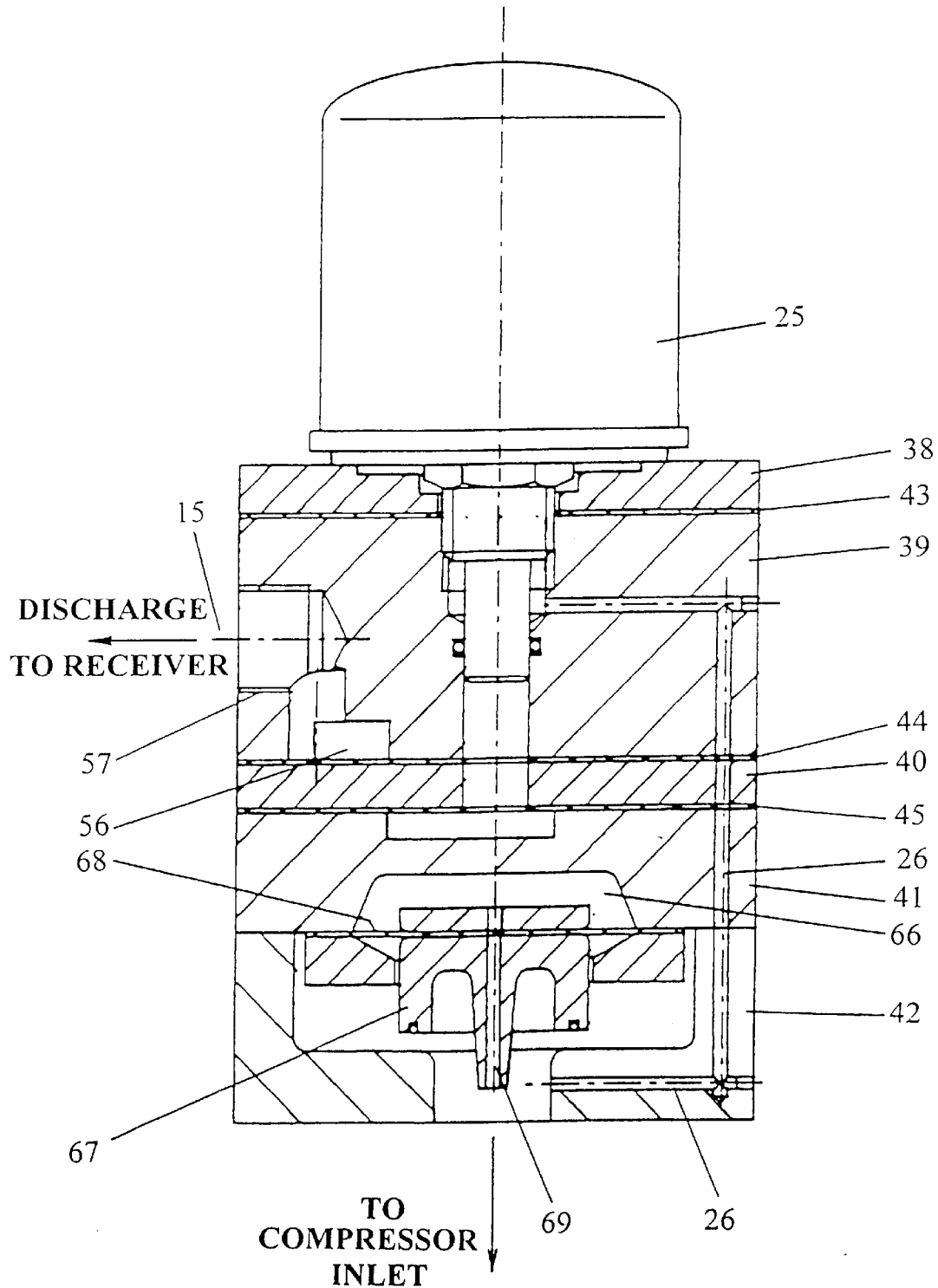
FIG. 19 is a cross-sectional view taken along line VI—VI of FIG. 16.
Figure 20:
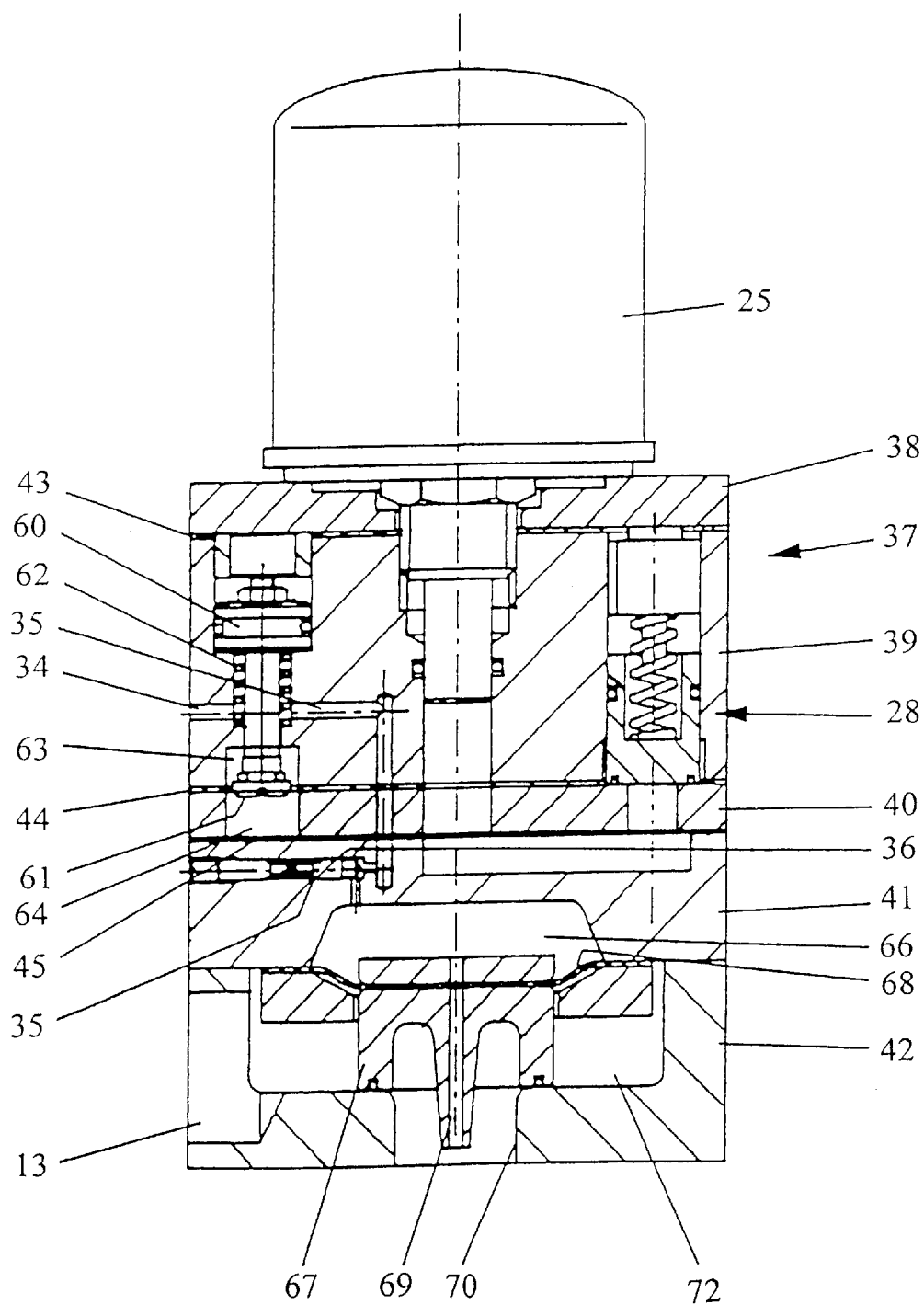
FIG. 20 is a view similar to FIG. 18 showing the valve arrangement in an unloaded state.
Figure 21:
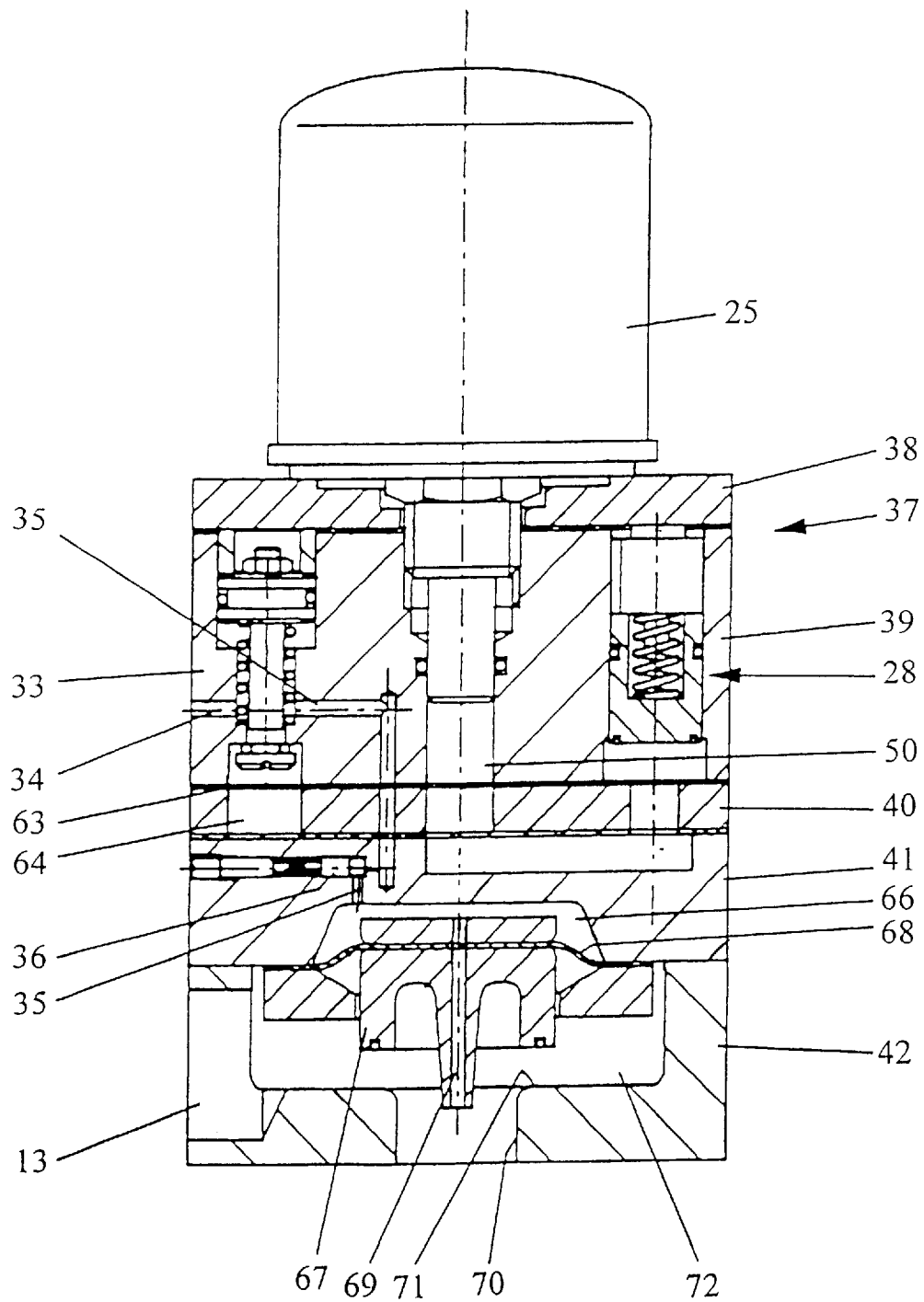
FIG. 21 is a view similar to FIGS. 18 and 20 showing the valve arrangement in a loaded state.

The filter assembly 25 includes an outer shell 46 which has an annular coalescent type filter element located therein. A central passage 47 is provided that communicates to an inner zone within the filter element and has a connection means 4 8 in the form of an outer screw thread that enables the filter assembly 25 to be screwed down onto the top face of the plate 38 so that the rim of the housing 46 is sealed against sealing surfaces on the plate 38. In this manner an outer space is provided between the shell 46 and the filter element and the inner one is located within the filter element itself. A distribution plate within the neck of the shell 46 enables gas flow to be directed to the outer space and this gas flow is received from line 17 to a connection zone 49 in the block 39 (see FIG. 17). Clean compressed air discharged from the passage 47 of filter assembly 25 is directed into a passage 50 formed in the block 39, gasket 44 and plate 40. As is best seen in FIG. 18, this compressed air from passage 50 is directed into a transverse passage 51 formed in the block 41 and thereafter through a vertical passage 52 formed through the gaskets 45, 44 and plate 40 into the base of the minimum pressure valve 28. The valve 28 is closed by a piston member 53 being urged by a spring 54 against a valve seat around passage 52. When the minimum pressure is reached, the piston 53 lights against the force of the spring 54 and pressurised air flows into chamber 55. A transverse passage 56 through block 39 communicates this chamber 55 to a discharge connection 57 enabling connection of the minimum pressure valve 28 via line 15 to the receiver 22 (see FIG. 19). At the same time the chamber 55 is communicated through a passage in block 39 to the base opening 58 of a pilot valve acting as a pressure switch 30 (see FIG. 17). The pilot valve 30 opens at a lower predetermined pressure (e.g. six bars) against the spring 59 and closes at an upper predetermined pressure (e.g. seven bars). At the upper predetermined pressure level, pressurised gas is caused to flow through passage means formed in the top plate 38 and/or the gasket 43 onto the top of the vent valve 33. The vent valve 33 comprises a spool valve element having an upper piston 60 connected to and of greater diameter than a lower piston 61 with a spring 62 urging the lower piston 61 to seal against a valve seat in chamber 63. When excess pressure is experienced on the upper piston 60 from the pilot valve, the spool element 60, 61 moves downwardly so that the valve seat in chamber 63 is opened. The chamber 63 is communicated via passage means 64 (see FIG. 1 and partly in FIG. 18) with the discharge passage 50 from the filter assembly 25 such that when the spool element 60, 61 has moved downwardly the pressurised gas is vented to atmosphere via line 34 and is at the same time supplied via passage 35 through a non return valve 36 to a chamber 66 formed above the main throttle valve 14 comprised of valve member 67 and the diaphragm 68.

I claim:

1. A control valve for a compressor system including a gas compressor of the type which is flooded with a liquid lubricant, a separator for separating the liquid lubricant from the compressed gas and a receiver for receiving the compressed gas, said control valve comprising:

a support member;

a throttle valve for receiving a gas flow from the atmosphere and throttling the gas flow to the compressor, said throttle valve being supported within said support member; and a filter for receiving a compressed gas flow from the separator and filtering entrained liquid droplets from the gas flow before passing the gas to the receiver, wherein said filter is supported by said support member.

2. A control valve as defined in claim 1 further comprising a minimum pressure valve which is adapted to open once a predetermined minimum pressure is achieved within said filter and supply compressed gas from said filter to the receiver.

3. A control valve as defined in claim 1 wherein said filter further comprises:

an outer shell attached to said support member which defines an internal substantially enclosed space;

an annular wall of filter material within the enclosed space having a pair of axially opposed ends, wherein one of the ends of the filter material is sealingly engaged with said support member and the other of the ends is closed to define a first zone outwardly of said filter material and a second zone inwardly of said filter material;

wherein one of said first zone and said second zone is in fluid communication with the separator for receiving a compressed gas flow having entrained liquid droplets and passing the gas flow to the filter material wherein the liquid droplets are removed, and wherein the other of said zones is in fluid communication with the receiver for receiving a clean compressed gas flow from the filter material and discharging the gas to the receiver.

4. A control valve as defined in claim 3 wherein said filter further comprises a compressed gas outlet port extending through said support member for discharging the compressed gas flow to the receiver.

5. A control valves as defined in claim 4 wherein said filter further comprises a compressed gas inlet port extending through said support member for receiving the compressed gas flow.

6. A control valve as defined in claim 5 further comprising a minimum pressure valve within said support member adapted to close and open said compressed gas outlet port, said minimum pressure valve being adapted to open once a predetermined minimum pressure is achieved within said filter and discharge compressed gas from said filter to the receiver.

7. A compressor system comprising:

a gas compressor which is flooded with a liquid lubricant for compressing gas and creating a gas flow;

a separator for separating the liquid lubricant from the compressed gas flow;

a liquid return in fluid communication between said separator and said compressor for returning separated liquid from said separator to said compressor;

a receiver for receiving the compressed gas; and a control valve, said control valve comprising:

a support member;

a throttle valve for receiving a gas flow from the atmosphere and throttling the gas flow to said compressor, said throttle valve being supported within said support member; and a filter for receiving a compressed gas flow from said separator and filtering entrained liquid droplets from the gas flow before passing the gas to said receiver, wherein said filter is supported by said support member.

8. A compressor system as defined in claim 7 further comprising a minimum pressure valve which is adapted to open once a predetermined minimum pressure is achieved within said filter and supply compressed gas from said filter to said receiver.

9. A compressor system comprising:

a gas compressor which is flooded with a liquid lubricant for compressing gas and creating a gas flow;

a separator for separating the liquid lubricant from the compressed gas flow;

a liquid return in fluid communication between said separator and said compressor for returning separated liquid from said separator to said compressor;

a receiver for receiving the compressed gas;

a control valve, said control valve comprising:

a support member;

a throttle valve for receiving a gas flow from the atmosphere and throttling the gas flow to said compressor said throttle valve being supported within said support member; and a filter for receiving a compressed gas flow from said separator and filtering entrained liquid droplets from the gas flow before passing the gas to said receiver, wherein said filter is supported by said support member; and a gas passage in fluid communication between said filter and said compressor for supplying gas to said compressor downstream of said throttle valve.

10. A control valve for a compressor system including a gas compressor of the type which is flooded with a liquid lubricant, a separator for separating the liquid lubricant from the compressed gas and a receiver for receiving the compressed gas, said control valve comprising:

a support member;

a throttle valve having an inlet port and an outlet port for receiving a gas flow from the atmosphere through said inlet port and throttling the gas flow through said outlet port to the compressor, said throttle valve and said inlet and outlet ports being supported within said support member; and a filter having a compressed gas inlet port and a compressed gas outlet port for receiving a compressed gas flow from the separator through said compressed gas inlet port and filtering entrained liquid droplets from the gas flow before passing the gas through said compressed gas outlet port to the receiver, wherein said filter is supported by said support member and said compressed gas inlet and outlet ports are supported within said support member.

11. A control valve as defined in claim 10 further comprising a minimum pressure valve which is adapted to open once a predetermined minimum pressure is achieved within said filter and supply compressed gas from said filter to the receiver.

12. A control valve as defined in claim 10 wherein said filter further comprises:

an outer shell attached to said support member which defines an internal substantially enclosed space;

an annular wall of filter material within the enclosed space having a pair of axially opposed ends, wherein one of the ends of the filter material is sealingly engaged with said support member and the other of the ends is closed to define a first zone outwardly of said filter material and a second zone inwardly of said filter material;

wherein one of said first zone and said second zone is in fluid communication with said compressed gas inlet port for receiving a compressed gas flow having entrained liquid droplets and passing the gas flow to said filter material wherein the liquid droplets are removed, and wherein the other of said zones is in fluid communication with said compressed gas outlet port for receiving a clean compressed gas flow from said filter material and discharging the gas to the receiver.

13. A control valve as defined in claim 12 further comprising a minimum pressure valve within said support member adapted to close and open said compressed gas outlet port, said minimum pressure valve being adapted to open once a predetermined minimum pressure is achieved within said filter and discharge compressed gas from said filter to the receiver.

* * * * *

UNITED STATES PATENT AND TRADEMARK OFFICE
CERTIFICATE OF CORRECTION

PATENT NO. : 5,803,715
DATED : September 8, 1998
INVENTOR(S) : Kitchener It is certified that error appears in the above-identified patent and that said Letters Patent is hereby corrected as shown below:

On the title page, item [30],
In the Foreign Application Priority Data, "Oct 14, 1996" should read --Oct. 14, 1991--.

Column 10, line 17, before "said" insert a comma (,).

Signed and Sealed this

Eighth Day of December, 1998

*Attest:*

*Attesting Officer*

BRUCE LEHMAN

*Commissioner of Patents and Trademarks*